(12) United States Patent
Shih et al.

(10) Patent No.: US 7,886,234 B2
(45) Date of Patent: Feb. 8, 2011

(54) SYSTEMS AND METHODS FOR CREATING EMBEDDED TARGET IMAGES

(75) Inventors: Hung-Kai Shih, Yunlin Hsien (TW);
Shih-Chang Hu, Hsin-Chu (TW);
Chih-Wei Ko, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 768 days.

(21) Appl. No.: 11/837,582

(22) Filed: Aug. 13, 2007

(65) Prior Publication Data
US 2008/0092073 A1  Apr. 17, 2008

Related U.S. Application Data

(60) Provisional application No. 60/829,303, filed on Oct. 13, 2006.

(51) Int. Cl.
*G06F 3/048* (2006.01)
(52) U.S. Cl. .................. 715/843; 715/841; 715/842; 715/844; 715/845; 715/964
(58) Field of Classification Search ................ 715/964, 715/841–845
See application file for complete search history.

(56) References Cited

U.S. PATENT DOCUMENTS

| | | | |
|---|---|---|---|
| 5,363,481 A | * | 11/1994 | Tilt .......................... 715/814 |
| 6,553,563 B2 | | 4/2003 | Ambrose et al. |
| 7,681,233 B1 | * | 3/2010 | Fox et al. ........................ 726/9 |
| 2002/0059054 A1 | * | 5/2002 | Bade et al. ..................... 703/20 |
| 2005/0203988 A1 | * | 9/2005 | Nollet et al. ................. 709/201 |
| 2006/0020659 A1 | * | 1/2006 | Cricco et al. ................. 709/203 |
| 2007/0220499 A1 | * | 9/2007 | Bannatyne et al. .......... 717/140 |
| 2007/0260538 A1 | * | 11/2007 | Deaton et al. ................. 705/39 |

FOREIGN PATENT DOCUMENTS

CN  1725177  1/2006

OTHER PUBLICATIONS

Partial English Translation of CN1725177A.
English Abstract of Chinese Patent Publication No. 1725177A.

* cited by examiner

*Primary Examiner*—Simon Ke
(74) *Attorney, Agent, or Firm*—Thomas, Kayden, Horstemeyer & Risley

(57) ABSTRACT

Methods for generating an embedded target image to be stored in a non-volatile memory device of an embedded system as firmware thereof are disclosed. A graphical user interface (GUI) editor is generated to facilitate a user in providing settings information for multiple pins of a chip installed in the embedded system. Source code is generated in response to operating results of the user of the GUI editor. Linking an object file compiled from the generated source code generates the embedded target image.

22 Claims, 30 Drawing Sheets

```
[GPIO]
GPIO0 = Mode0(GPIO0)    Mode1(DICL)        Mode2(DSP_GPO3)  Mode3( ) PD         ─Stat611
GPIO1 = Mode0(GPIO1)    Mode1(BSI_RFIN)    Mode2( )         Mode3( ) PD         ─Stat613     Stat
GPIO2 = Mode0(GPIO2)    Mode1(DID)         Mode2( )         Mode3( ) PU         ─Stat615      61
GPIO3 = Mode0(GPIO3)    Mode1(DIMS)        Mode2( )         Mode3( ) PD         ─Stat617
GPIO4 = Mode0(GPIO4)    Mode1(DSP_CLK)     Mode2(DSPLCK)    Mode3(EDICK) Z      ─Stat619

[GPO]
GPO0 = Mode0(GPO0)      Mode1(SRCLKENA)    Mode2( )         Mode3( )            ─Stat631     Stat
GPO1 = Mode0(GPO1)      Mode1(SRCLKENAN)   Mode2( )         Mode3( )            ─Stat633      63
GPO2 = Mode0(GPO2)      Mode1(EPDN#)       Mode2(6.5MHz)    Mode3(26MHz)        ─Stat635

[EINT]
EINT_COUNT = 8  ─Stat651                                                                     Stat
EINT_DEBOUNCE_TIME_COUNT = 4  ─Stat653                                                        65

[ADC]                                                                                        Stat
ADC_COUNT = 7  ─Stat671                                                                       67

[Keypad]                                                                                     Stat
KEY_ROW = 6     ─Stat691                                                                      69
KEY_COLUMN = 7  ─Stat693
```

```
[GPIO_variables]
; gpio_bt_reset_pin is for bluetooth reset          —Comm711
gpio_bt_reset_pin                                    —Var711
; gpio_bt_dsc_pin is for bluetooth disconnection    —Comm713
gpio_bt_dsc_pin                                      —Var713
; gpio_bt_power_pin is for bluetooth power on       —Comm715
gpio_bt_power_pin                                    —Var715
; gpio_bt_dataselect_pin is for bluetooth data selection —Comm717
gpio_bt_dataselect_pin                               —Var717
; gpio_rf_controll_pin is for RF control 1          —Comm719
gpio_rf_controll_pin                                 —Var719
```
⸺ Stat 71

```
[gpio_drv.h_HEADER]
#ifndef _GPIO_DRV_H_
#define _GPIO_DRV_H_
```
⸺ Stat 73

```
[gpio_drv.h_TAILER]
#endif /* _GPIO_DRV_H_ */
```
⸺ Stat 75

```
[gpio_var.c_HEADER]
#ifdef __CUST_NEW__
#include "gpio_drv.h"
```
⸺ Stat 77

```
[gpio_var.c_TAILER]
#endif /* __CUST_NEW__ */
```
⸺ Stat 79

```
[EINT_variables]
; AUX_EINT_NO is for external device interrupt    —Comm811
AUX_EINT_NO    —Var811
; TOUCH_PANEL_EINT_NO is for touch panel interrupt —Comm813
TOUCH_PANEL_EINT_NO    —Var813
; CHRDET_EINT_NO is for charger detection interrupt —Comm815
CHRDET_EINT_NO    —Var815
; BT_EINT_NO is for Bluetooth interrupt    —Comm817
BT_EINT_NO    —Var817
```
⎫ Stat 81

```
[eint_drv.h_HEADER]
#ifndef _EINT_DRV_H_
#define _EINT_DRV_H_
```
⎫ Stat 83

```
[eint_drv.h_TAILER]
#endif /* _EINT_DRV_H_ */
```
⎫ Stat 85

```
[eint_var.c_HEADER]
#ifdef __CUST_NEW__
#include "eint_drv.h"
```
⎫ Stat 87

```
[eint_var.c_TAILER]
#endif /* __CUST_NEW__ */
```
⎫ Stat 89

FIG. 11

```
[ADC_variables]
; ADC_VBAT is to measure the battery voltage.       ──Comm911
ADC_VBAT        ──Var911
; ADC_VISENSE is to measure the charging current.   ──Comm913
ADC_VISENSE     ──Var913
; ADC_VBATTMP is to measure the battery temperature. ──Comm915
ADC_VBATTMP     ──Var915
; ADC_VCHARGER is to measure the charger voltage.   ──Comm917
ADC_VCHARGER    ──Var917
; ADC_ACCESSORYID is to measure the plug-in accessory voltage. ──Comm919
ADC_ACCESSORYID ──Var919
```
⎫ Stat 91

```
[adc_var.c_HEADER]
#ifdef __CUST_NEW__
#include "kal_release.h"
#include "adc.h"
```
⎫ Stat 93

```
[adc_var.c_TAILER]
#endif /* __CUST_NEW__ */
```
⎫ Stat 95

FIG. 12

```
[Key_definition]
DEVICE_KEY_0        —Def1010
DEVICE_KEY_1        —Def1011
DEVICE_KEY_2        —Def1012
DEVICE_KEY_3        —Def1013
DEVICE_KEY_4        —Def1014
DEVICE_KEY_5        —Def1015
DEVICE_KEY_6        —Def1016
DEVICE_KEY_7        —Def1017
DEVICE_KEY_8        —Def1018
DEVICE_KEY_9        —Def1019
DEVICE_KEY_STAR     —Def101A
DEVICE_KEY_HASH     —Def101B
DEVICE_KEY_VOL_UP   —Def101C
DEVICE_KEY_VOL_DOWN —Def101D
```
⎫ Stat 101

```
[keypad_drv.h HEADER]
#ifndef _KEYPAD_DRV_H_
#define _KEYPAD_DRV_H_
```
⎫ Stat 103

```
[keypad_drv.h TAILER]
#endif /* _KEYPAD_DRV_H_ */
```
⎫ Stat 105

FIG. 13

| | Def.Mode | M0 | M1 | M2 | M3 | Pull | Def.Dir | In | Out | INV | VarName1 | VarName2 |
|---|---|---|---|---|---|---|---|---|---|---|---|---|
| GPIO0 | 0:GPIO0 | ☒ | ☐ | | | ☒PD | OUT | ☐ | ☒ | ☐ | gpio_led_status1_en_pin | |
| GPIO1 | 0:GPIO1 | ☒ | | | | ☒PD | OUT | ☐ | ☒ | ☐ | gpio_camera_power_en_pin | |
| GPIO2 | NC | | | | | ☒PD | | | | | | |
| GPIO3 | 0:GPIO3 | ☒ | ☐ | ☐ | ☐ | ☒PD | OUT | ☐ | ☒ | ☐ | gpio_bt_dataselect_pin | |
| GPIO4 | 0:GPIO4 | ☒ | ☐ | ☐ | ☐ | ☒PD | OUT | ☐ | ☒ | ☐ | gpio_bt_dsc_pin | |
| GPIO5 | 0:GPIO5 | ☒ | ☐ | ☐ | ☐ | ☒PD | OUT | ☐ | ☒ | ☐ | gpio_led_mainbl_en_pin | |
| GPIO6 | 0:GPIO6 | ☒ | ☐ | ☐ | ☐ | ☒PD | OUT | ☐ | ☒ | ☐ | gpio_flashlight_en_pin | |
| GPIO7 | 0:GPIO7 | ☒ | ☒ | ☐ | ☐ | ☒PD | OUT | ☐ | ☒ | ☐ | gpio_vibrator_en_pin | |
| GPIO8 | 0:GPIO8 | ☒ | ☒ | ☐ | ☐ | ☒PD | OUT | ☐ | ☒ | ☐ | gpio_sccb_serial_clk_pin | |
| GPIO9 | 0:GPIO9 | ☒ | ☐ | ☐ | ☐ | ☒PD | OUT | ☐ | ☒ | ☐ | gpio_sccb_seraial_data_pin | |
| GPIO10 | 0:GPIO10 | ☒ | | | | | | | | | | |

FIG. 15

|        | Def.Mode    | M0 | M1 | M2 | M3 |
|--------|-------------|----|----|----|----|
| GPIO0  | 0:GPIO0     | ☑  | ☐  | ☐  |    |
| GPIO1  | 0:GPIO1     | ☑  | ☑  |    |    |
| GPIO2  | NC          |    |    |    |    |
| GPIO3  | 1:DIMS      | ☐  | ☑  |    |    |
| GPIO4  | 1:DSP_CLK   | ☑  | ☑  | ☐  |    |

FIG. 17

|        | Def.Mode     |
|--------|--------------|
| GPIO0  | 0:GPIO0      |
| GPIO1  | 0:GPIO0      |
| GPIO2  | 1:DICL       |
| GPIO3  | 2:DSP_GPO3   |
| GPIO4  | 3:           |
| GPIO5  | NC           |
| GPIO6  | 0:GPIO6      |
| GPIO7  | 0:GPIO7      |

FIG. 16

| | VarName1 | VarName2 | |
|---|---|---|---|
| ⋮ | ⋮ | ⋮ | |
| GPIO0 | gpio_led_status1_en_pin | | |
| GPIO1 | gpio_led_status_en_pin | | |
| GPIO2 | gpio_led_status1_en_pin | —M1700 | |
| | gpio_led_status2_en_pin | | |
| | gpio_led_status3_en_pin | | |
| | gpio_led_keybl_en_pin | | |
| ⋮ | | ⋮ | |

FIG. 20

| GPIO setting | GPO setting | EINT setting | ADC setting | KEYPAD setting |

| | Def.Mode | M0 | M1 | M2 | M3 | VarName1 | VarName2 |
|---|---|---|---|---|---|---|---|
| GPO0 | 1:CRCLKENA | ☐ | ☐ | | | | |
| GPO1 | 0:GPO1 | ☑ | ☐ | | | gpio_afe_amplifier_pin | |
| GPO2 | 0:GPO2 | ☑ | ☐ | | | gpio_usb_enable_pin | |
| GPO3 | 1:EA24 | ☐ | ☑ | ☐ | | | |
| GPO4 | 1:EA25 | ☐ | ☑ | ☐ | | | |

Submit   Cancel

FIG. 21

| | GPIO setting | GPO setting | EINT setting | ADC setting | KEYPAD setting |
|---|---|---|---|---|---|
| | EINT Var | | | Debounce time(10ms) | |
| EINT0 | AUX_EINT_NO | | | 50 | |
| EINT1 | TOUCH_PANEL_EINT_NO | | | 0 | |
| EINT2 | CHR_USB_EINT_NO | | | 50 | |
| EINT3 | BT_EINT_NO | | | 50 | |
| EINT4 | NC | | | | |
| EINT5 | NC | | | | |
| EINT6 | NC | | | | |

L1150
G1151
G1153
F1150

Submit   Cancel

FIG. 22

| EINT Var | Debounce time(10ms) |
|---|---|
| EINT0 AUX_EINT_NO | |
| EINT1 SWDBG_EINT_NO | |
| EINT2 AUX_EINT_NO | |
| EINT3 TOUCH_PANEL_EINT_NO | |
| EINT4 CHRDET_EINT_NO | |
| EINT5 MOTION_SENSOR_EINT_NO | |
| EINT6 BT_EINT_NO | |
| EINT7 USB_EINT_NO | |
| CHR_USB_EINT_NO | |
| NC | |

| | | | | |
|---|---|---|---|---|
| GPIO setting | GPO setting | ENT setting | ADC setting | KEYPAD setting |

| | ADC Var |
|---|---|
| ADC0 | ADC_VBAT |
| ADC1 | ADC_VISENSE |
| ADC2 | ADC_VBATTMP |
| ADC3 | ADC_VCHARGER |
| ADC4 | NC |
| ADC5 | ADC_ACCESSORYID |
| ADC6 | ADC_CHR_USB |

FIG. 25

| GPIO setting | GPO setting | EINT setting | ADC setting | KEYPAD setting | | |
|---|---|---|---|---|---|---|
| | Column0 | Column1 | Column2 | Column3 | Column4 | Column5 | Column6 |
| Row0 | SEND | SK_RIGHT | NONE | FUNCTION | NONE | NONE | END |
| Row1 | UP | SK_LEFT | MENU | NONE | NONE | NONE | END |
| Row2 | DOWN | LEFT | RIGHT | NONE | NONE | NONE | END |
| Row3 | NONE | VOL_UP | NONE | VOL_DOWN | NONE | NONE | END |
| Row4 | NONE | NONE | NONE | NONE | NONE | NONE | END |
| Row5 | NONE | NONE | NONE | NONE | NONE | NONE | END |

FIG. 27

|  | Column0 | Column1 | Column2 | Column3 | Column4 | Column5 | Column6 |
|---|---------|---------|---------|---------|---------|---------|---------|
| Row0 | SEND | SK_RIGHT | NONE | FUNCTION | NONE | NONE | END |
| Row1 | UP | SK_LEFT | MENU | NONE | NONE | NONE | END |
| Row2 | DOWN ▷ | LEFT | RIGHT ▷ | NONE ▷ | NONE ▷ | NONE ▷ | END ▷ |
| Row3 | NONE | DOWN | NONE | VOL_DOWN | NONE | NONE | END |
| Row4 | NONE | LEFT | NONE | NONE | NONE | NONE | END |
| Row5 | NONE | RIGHT | NONE | NONE | NONE | NONE | END |
|  | | MENU | | | | | |
|  | | FUNCTION | | | | | |
|  | | SK_LEFT | | | | | |
|  | | SK_RIGHT | | | | | |
|  | | SEND | | | | | |
|  | | END | | | | | |
|  | | POWER | | | | | |
|  | | NONE | | | | | |

SYSTEMS AND METHODS FOR CREATING EMBEDDED TARGET IMAGES

CROSS-REFERENCE TO RELATED APPLICATIONS

The present application claims the benefit of U.S. provisional applications entitled "DRIVER CUSTOMIZATION TOOL", Ser. No. 60/829,303, filed Oct. 13, 2006.

BACKGROUND

The invention relates to image file generation, and more particularly, to systems and methods for creating embedded target images.

An embedded system is an electronic system that utilizes a CPU chip, but is not a general-purpose workstation, desktop or notebook computer. Embedded systems generally use microprocessors, custom-designed chips, or both. They may be used in mobile phones, planes, trains, space vehicles, machine tools, cameras, consumer and office appliances, PDAs (personal digital assistants), robots, and toys. In embedded systems, the software typically resides in a non-volatile memory device, such as a flash memory or ROM (read only memory) chip, in contrast to a general-purpose computer that loads its programs into RAM (random access memory). In order to comply with various hardware configurations for embedded systems, several source files and/or header files are conventionally modified by manual revision of source code thereof, object files are then generated by compiling the modified source files and/or header files. The object files are employed to generate target images to be written to a non-volatile memory device of an embedded system. Direct revision of source code of source files and/or header files is, however, time-consuming and risky.

SUMMARY

Methods for generating an embedded target image to be stored in a non-volatile memory device of an embedded system as firmware thereof are provided. An embodiment of a method for generating an embedded target image comprises the following steps. A graphical user interface (GUI) editor is generated for facilitating a user in providing settings information for multiple pins of a chip installed in the embedded system. Source code is generated in response to operating results of the GUI editor by the user. Linking an object file compiled from the generated source code generates the embedded target image.

Systems for generating an embedded target image to be stored in a non-volatile memory device of an embedded system as firmware thereof are provided. An exemplary embodiment of a system for generating an embedded target image comprises a display, a storage device and a processing unit coupling thereto. The processing unit generates and displays a GUI editor to facilitate a user in providing settings information for multiple pins of a chip installed in the embedded system. The processing unit generates source code in response to operating results of the GUI editor by the user, and generates the embedded target image by linking an object file compiled from the generated source code.

BRIEF DESCRIPTION OF THE DRAWINGS

The invention can be more fully understood by reading the subsequent detailed description and examples with references made to the accompanying drawings, wherein:

FIG. 9 shows the content of an exemplary configuration file;

FIG. 10 shows the content of an exemplary GPIO component file;

FIG. 11 shows the content of an exemplary GPIO component file;

FIG. 12 shows the content of an exemplary ADC component file;

FIG. 13 shows the content of an exemplary keypad component file;

FIG. 15 is a diagram of an exemplary data sheet of GPIO pins;

FIG. 16 is a diagram illustrating an exemplary mode drop down menu;

FIG. 17 is a diagram illustrating exemplary check boxes;

FIG. 20 is a diagram illustrating an exemplary variable drop down menu;

FIG. 21 is a diagram of an exemplary data sheet of GPO pins;

FIG. 22 is a diagram of an exemplary data sheet of EINT pins;

FIG. 23 is a diagram illustrating an exemplary variable drop down menu;

FIG. 25 is a diagram of an exemplary data sheet of ADC pins;

FIG. 27 is a diagram of an exemplary data sheet of keypad pins; and

FIG. 28 is a diagram illustrating an exemplary definition drop down menu.

DETAILED DESCRIPTION

Figure 1:
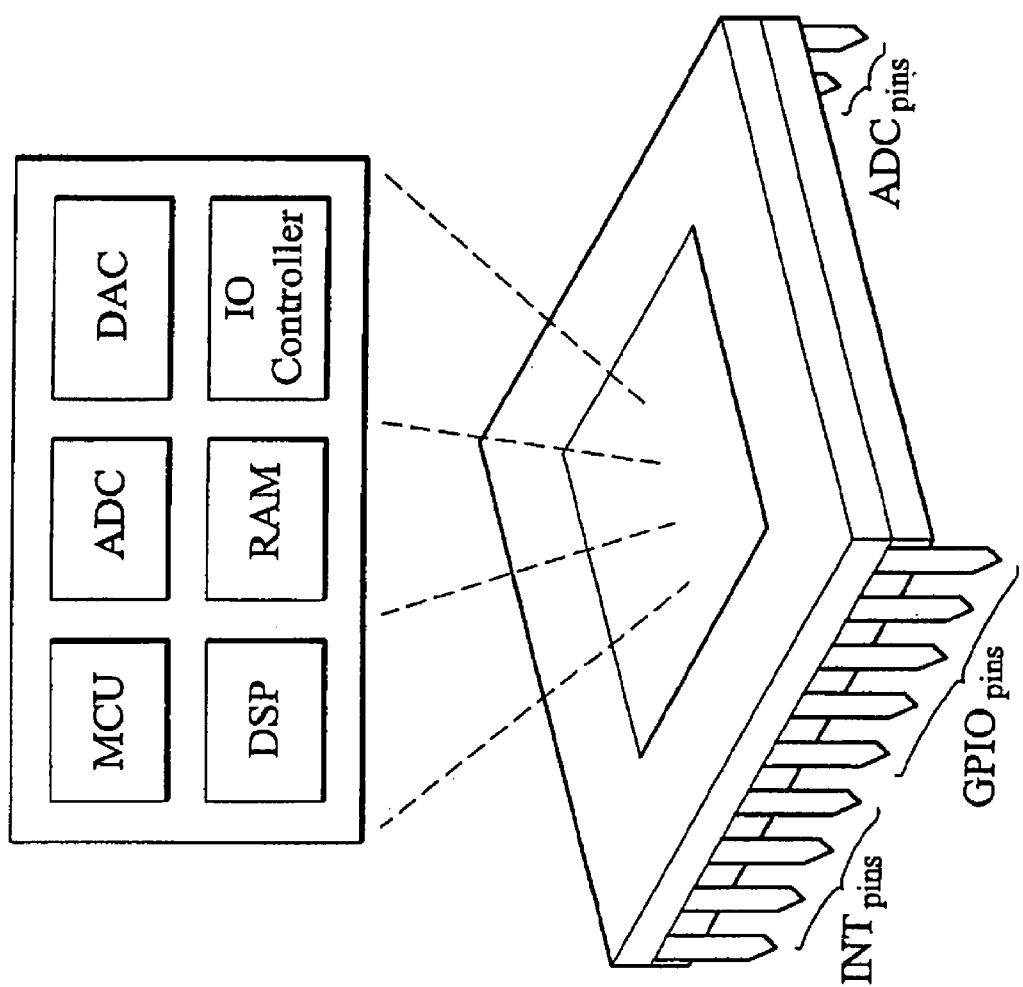
FIG. 1 is a diagram of an embodiment of a baseband chip.
Figure 2B:
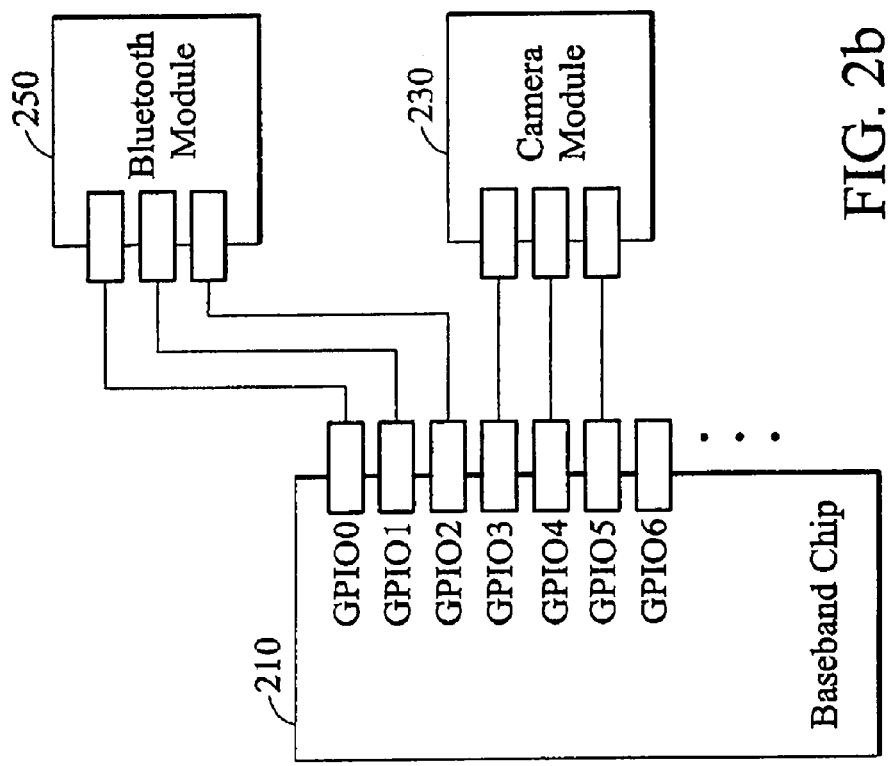
FIGS. 2a and 2b are diagrams of different hardware layouts for a baseband chip.
Figure 2A:
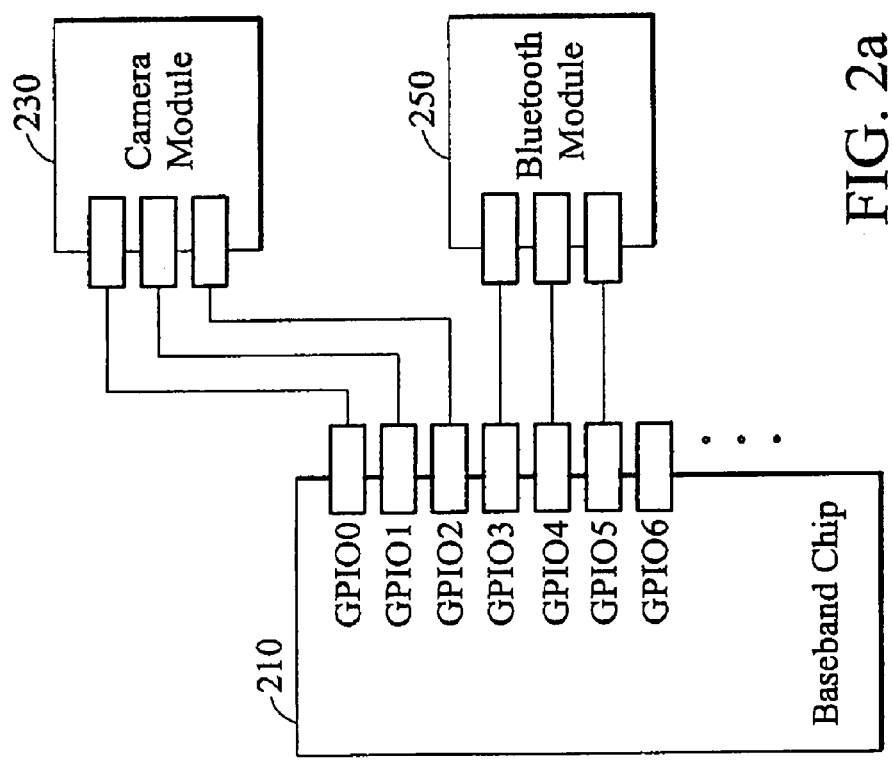
Figure 3:
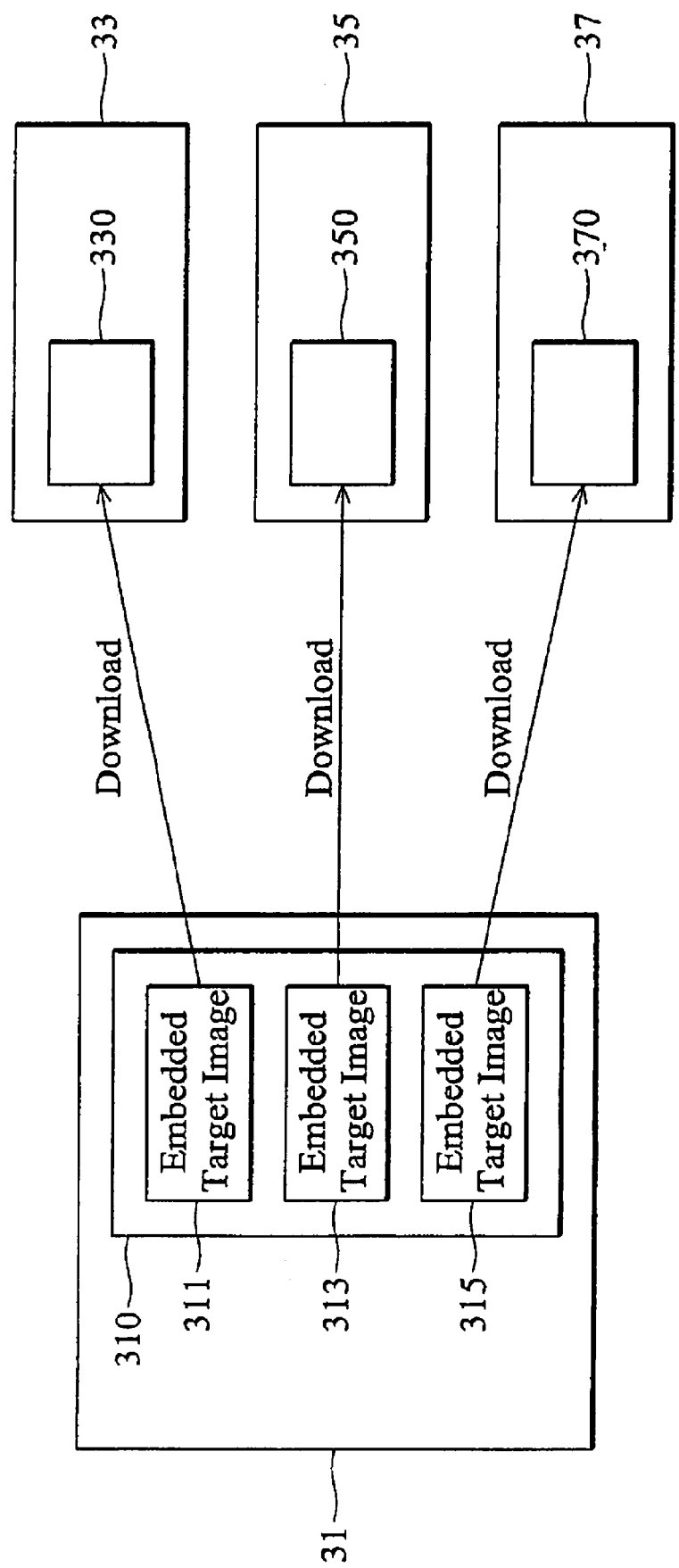
FIG. 3 is a diagram of embedded target image versions downloaded to non-volatile memory devices as firmware for embedded systems.

FIG. 1 is a diagram of an embodiment of a baseband chip. The baseband chip comprises various hardware circuits such as microprocessors (MCU), analog-to-digital converters (ADC), digital-to-analog converters (DAC), digital signal processors (DSP), random access memory (RAM), IO controllers and others. The baseband chip interacts with outside electronic devices such as camera modules, keypad controllers and others, via pins such as general purpose input output (GPIO), general purpose output (GPO), external interrupt (EINT), ADC, keypad pins and others. FIGS. 2a and 2b are diagrams of different hardware layouts for combinations of a baseband chip 210, a camera module 230 and a Bluetooth module 250. In a hardware layout, referring to FIG. 2a, the baseband chip 210 connects to the camera module 230 via GPIO pins GPIO0 to GPIO2, and to the Bluetooth via GPIO pins GPIO4 to GPIO6. In another hardware layout, referring to FIG. 2b, the baseband chip 210 connects to the camera module 230 via GPIO pins GPIO4 to GPIO6, and to the Bluetooth via GPIO pins GPIO0 to GPIO2. In order to comply with different hardware layouts and interface configurations, a baseband chip manufacturer must provide different embedded target image versions for driving the baseband chip 210. FIG. 3 is a diagram of three embedded target image versions 311, 313 and 315 stored in a storage device 310 of a computer 31 and respectively downloaded to non-volatile memory devices 330, 350 and 370 as firmware for embedded systems 33, 35 and 37.

Figure 4:
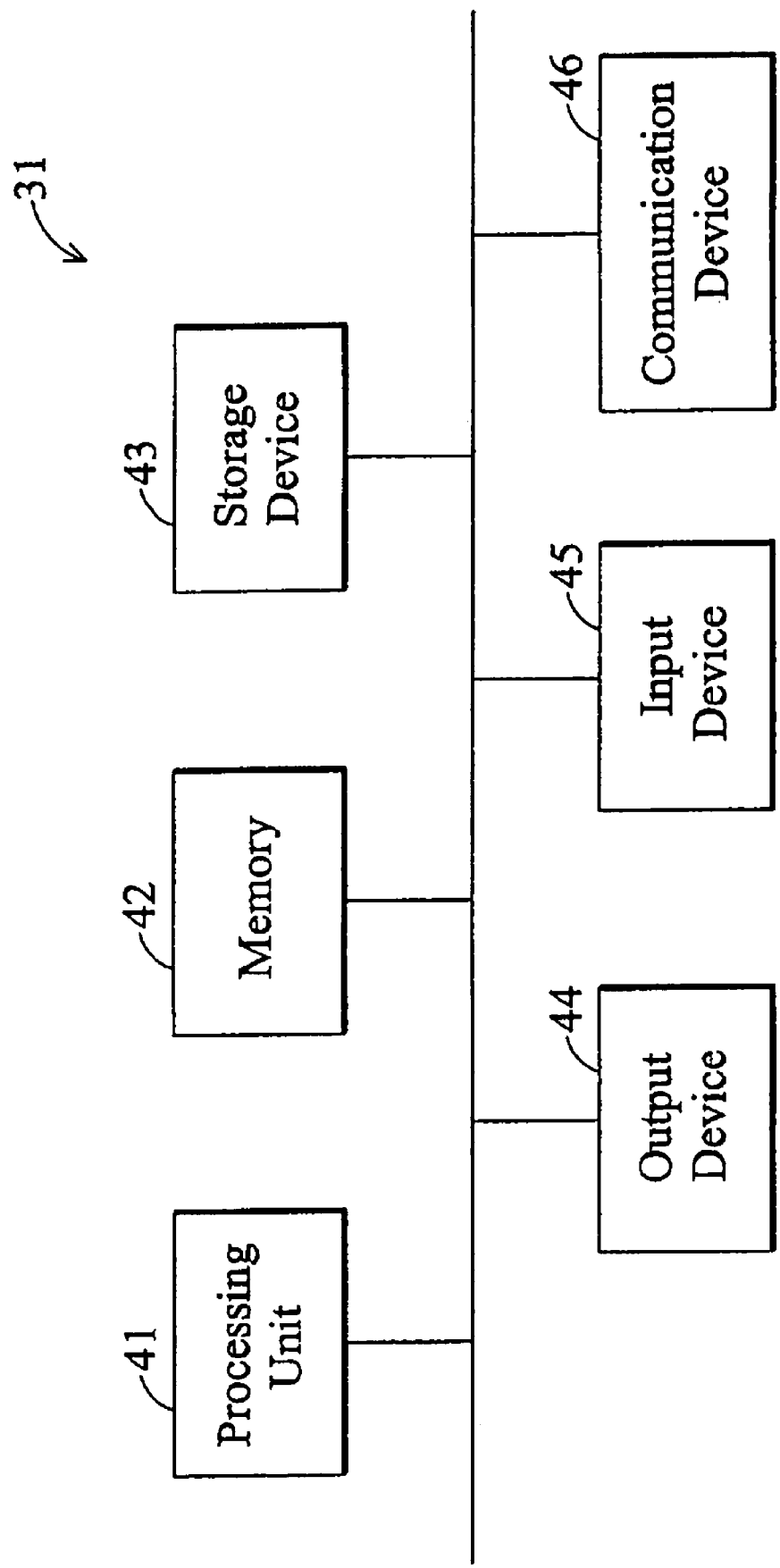
FIG. 4 is a diagram of a hardware environment applicable to a computer.

FIG. 4 is a diagram of a hardware environment applicable to an embodiment of the computer 31, comprising a processing unit 41, memory 42, a storage device 43, an output device 44, an input device 45 and a communication device 46. The processing unit 41 is connected to the memory 42, storage device 43, output device 44, input device 45 and communication device 46 via buses 47 based on Von Neumann architecture. There may be one or more processing units 41, such that the processor of the computer comprises a single central processing unit (CPU), a microprocessing unit (MPU) or multiple processing units, commonly referred to as a parallel processing environment. The memory 42 is preferably a random access memory (RAM), but may also include read-only memory (ROM) or flash ROM. The memory 42 preferably stores program modules executed by the processing unit 41 to create embedded target images. Generally, program modules include routines, programs, objects, components, or others, that perform particular tasks or implement particular abstract data types. Moreover, those skilled in the art will understand that some embodiments may be practiced with other computer system configurations, including handheld devices, multiprocessor-based, microprocessor-based or programmable consumer electronics, network PCs, minicomputers, mainframe computers, and the like. The storage device 43 may be a hard drive, magnetic drive, optical drive, portable drive, or nonvolatile memory drive. The drives and associated computer-readable media thereof (if required) provide non-volatile storage of computer-readable instructions, data structures and program modules. The input device 45 may connect to a mouse, a keyboard or similar, and receive input signals therefrom. The output device 44 may connect to an external display such as such as a color super-twisted nematic (CSTN) display, a thin film transistor-liquid crystal display (TFT-LCD), an organic light-emitting diode (OLED) display or similar, to direct the external display to generate graphical user interfaces (GUI). Users may interact with the generated GUIs to facilitate generation of embedded target images.

Figure 5:
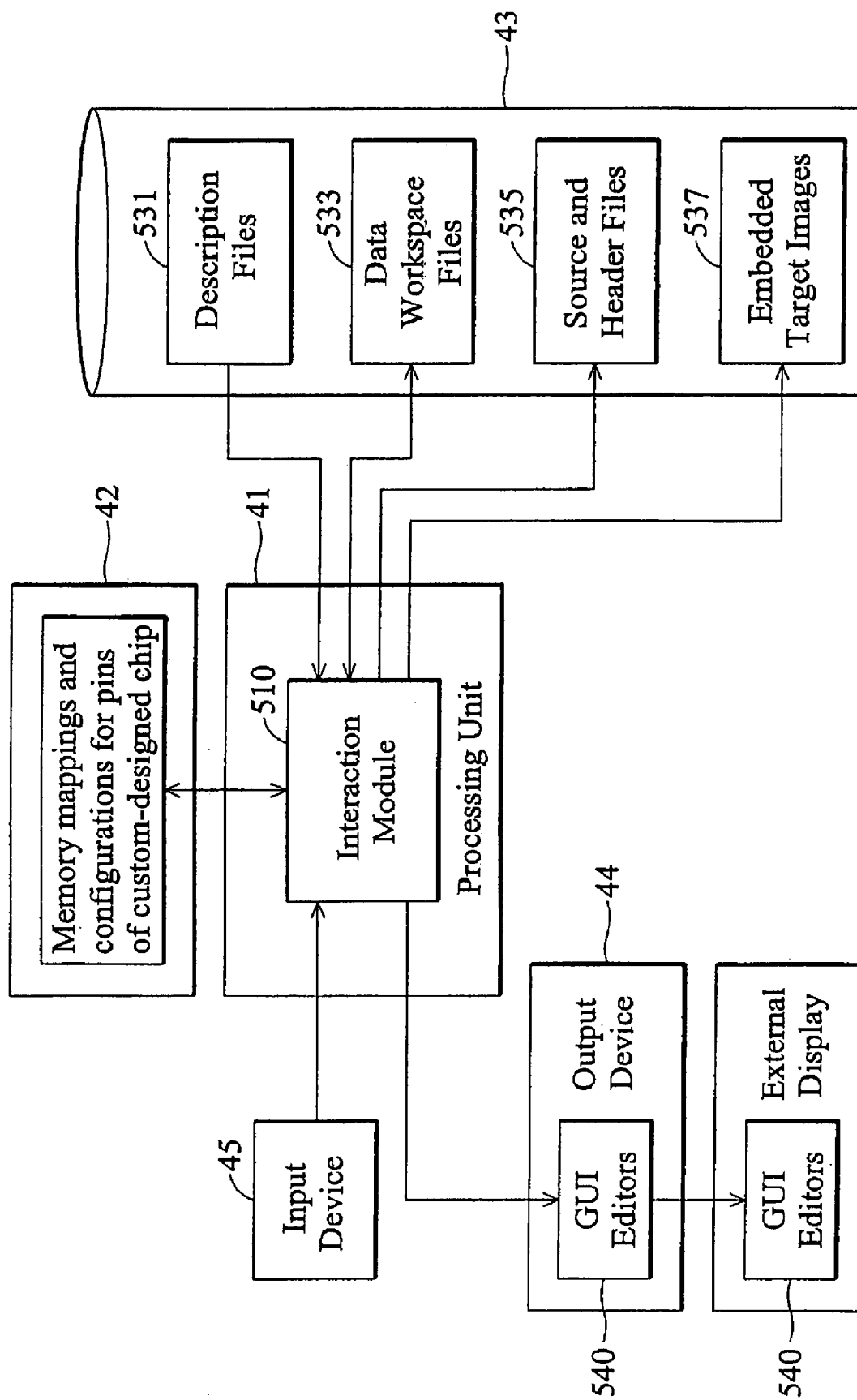
FIG. 5 is a diagram of an embodiment of a system for generating embedded target images.
Figure 6:
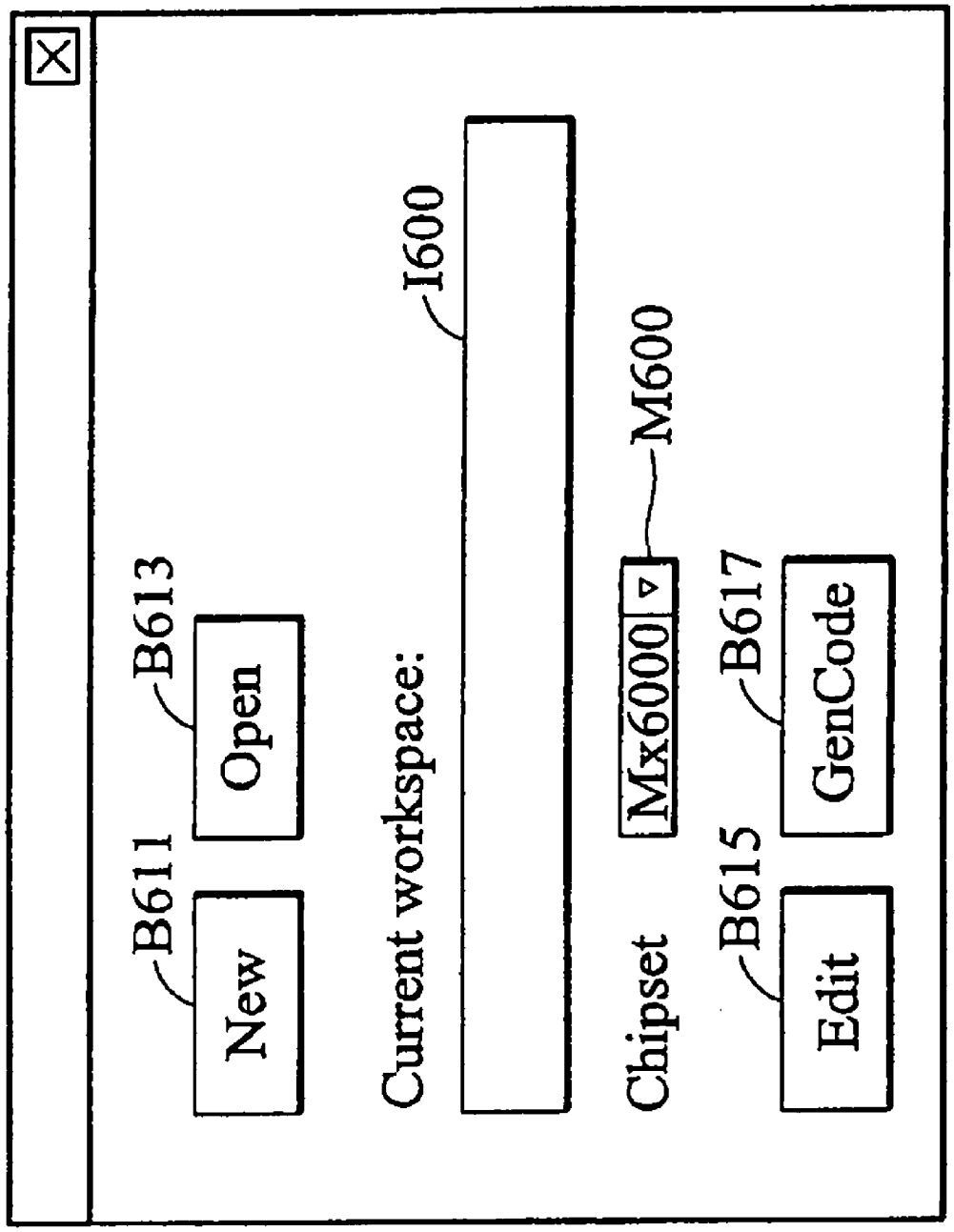
FIG. 6 is a diagram illustrating an exemplary main GUI (graphical user interface)
Figure 7:
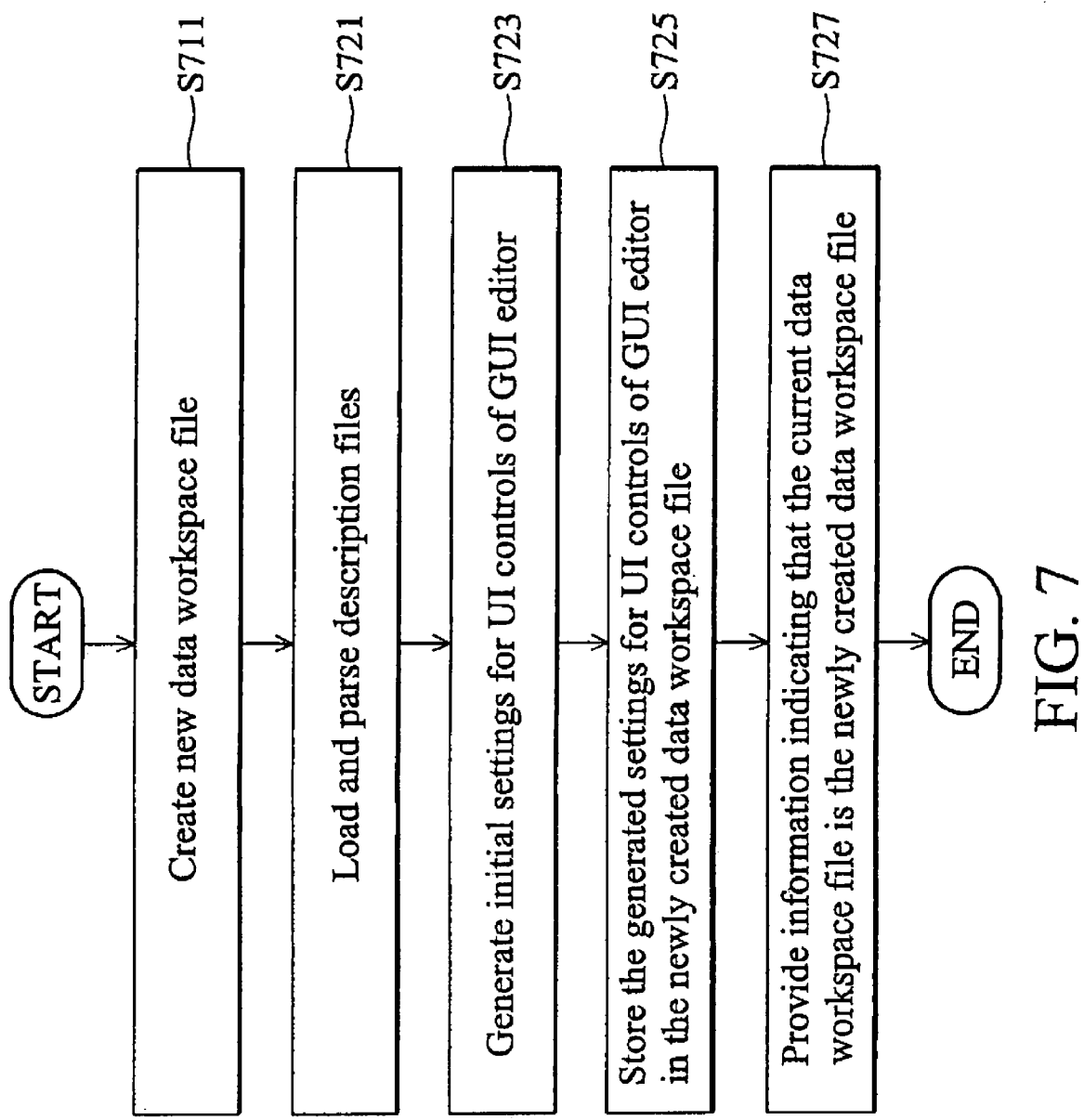
FIG. 7 is a flowchart illustrating an embodiment of a method for creating a new data workspace file.

FIG. 5 is a diagram of an embodiment of a system for generating embedded target images. An interaction module 510 executed by the processing unit 41 provides a main GUI facilitating users in performing tasks for generating a new workspace project, loading and editing a present workspace project, and generating source code based on information stored in a present workspace project. FIG. 6 is a diagram illustrating an exemplary main GUI comprising buttons B611, B613, B615 and B617, input field 1600, and a drop down menu M600. When the button with a caption "New" B611 is pressed, the interaction module 510 loads and parses description files 531, and creates a new data workspace file comprising initial settings for various UI controls of a GUI editor according to the parsed results. FIG. 7 is a flowchart illustrating an embodiment of a method for creating a new data workspace file when detecting the button B611 (FIG. 6) is pressed. In step S711, a new data workspace file (e.g. one of 533 of FIG. 5, typically named in .dws) is created. In step S721, description files (e.g. 531 of FIG. 5) are loaded and parsed. Detailed description of files and parsing thereof is provided later, and only briefly described herein. In step S723, initial settings for UI controls of a GUI editor are generated according to the parsed results. Detailed description of the generation of initial settings for UI controls of the GUI editor is provided later, and only briefly described herein. In step S725, the generated settings for UI controls of the GUI editor are stored in the newly created data workspace file. In step S727, information indicating that the current data workspace file is the newly created data workspace file is provided. The provided information is cached in the memory 42 (FIG. 5).

Figure 8:
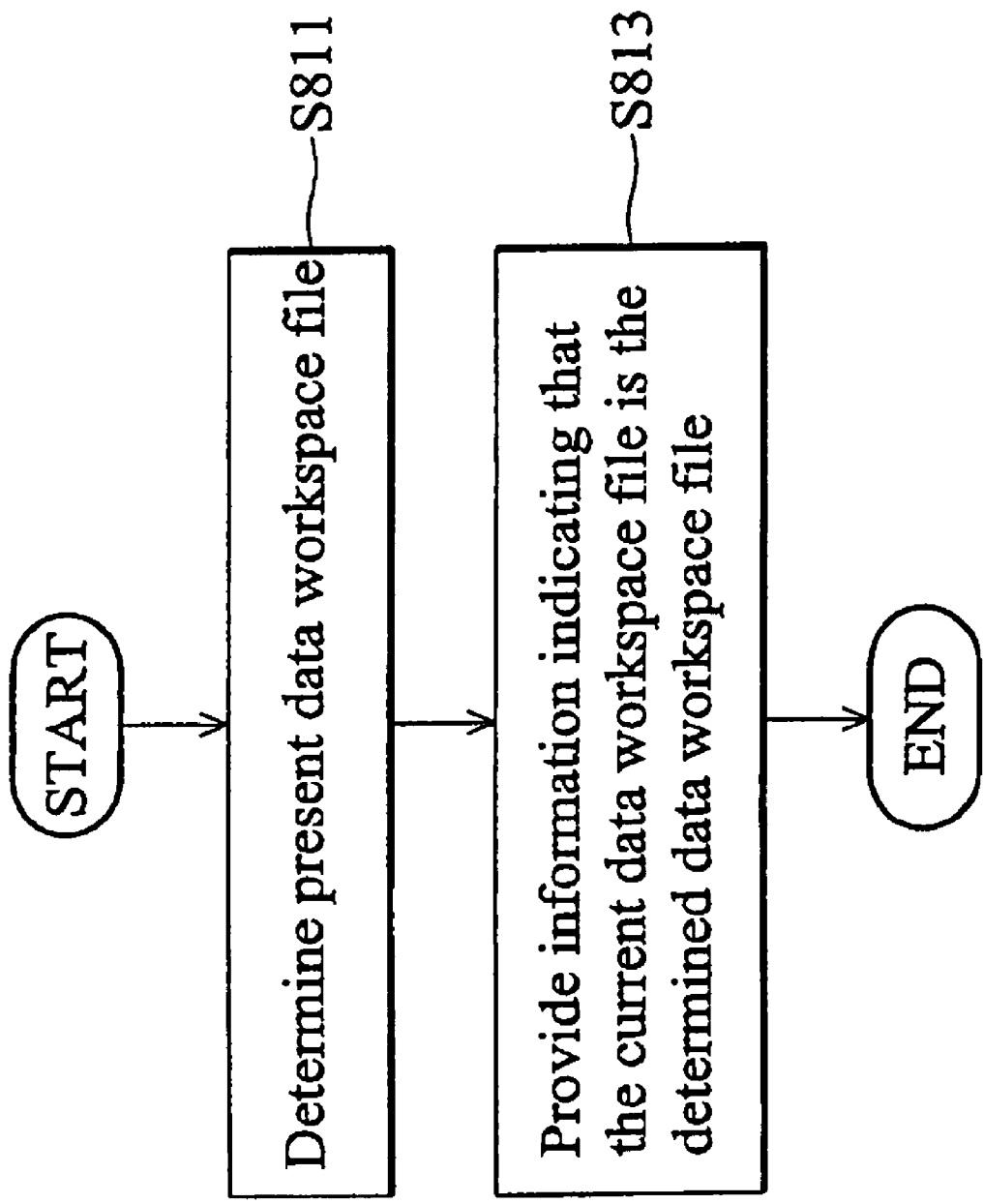
FIG. 8 is a flowchart illustrating an embodiment of a method for opening a present data workspace file.

Referring to FIG. 6, when the button with a caption "Open" B613 is pressed, the interaction module 510 determines a present data workspace file by a user, and indicates that the current data workspace file is the determined data workspace file. FIG. 8 is a flowchart illustrating an embodiment of a method for opening a present data workspace file when detecting the button B613 (FIG. 6) is pressed. In step S811, a user determines the current data workspace. For example, a user may input a file path "D:\work\customization\Doc\codegen\TOP_6227_BB.dws" in the input field 1600 (FIG. 6) to determine a present data workspace file. In step S813, information indicating that the current data workspace file is the determined data workspace file is provided. The provided information is cached in the memory 42 (FIG. 5).

Referring to FIG. 6, when the button with a caption "Edit" B615 is pressed, the GUI editor is generated and displayed on a display according to settings for UI controls in the current data workspace file. Users may interact with the GUI editor via the input device 45 to configure pins of the custom-designed chip, and determine mappings between custom-designed chip pins and variables used in software applications. The interaction module 510 caches these mappings and configurations for pins of the custom-designed chip in the memory 520 while users interact with the displayed GUI 540. When receiving a saving signal via the input device 45, the interaction module 510 records these mappings and configurations from the memory 42 to the current data workspace file. The interaction module 510 can later retrieve the stored workspace file and generate a GUI comprising the previously generated mappings and configurations for pins of the custom-designed chip to improve efficiency for generating embedded target images. Detailed description of generation and operation of the GUI editor is provided later, and only briefly described herein.

Referring to FIG. 6, when the button with a caption "Gen-Code" B617 is pressed, the interaction module 510 generates and records source and header files 535 (typically named in .c for source files and .h for header files) in the storage device 43 according to the stored mappings and configurations for pins of a custom-designed chipset in the current data workspace file. Detailed description of code generation for source files and header files is provided later, and only briefly described herein. The interaction module 510 can later compile the stored source and header files to generate object files using a compiler such as C compiler, or similar, and link the generated object files using a linker such as ARM link, or similar, corresponding to an embedded system to generate an embedded target image 537.

The description files comprise a configuration file (typically named in .fig) and multiple component files (typically named in .cmp). The configuration file describes GPIO, EINT, ADC and keypad hardware configurations for a particular custom-designed chip. The component files comprises a GPIO component file describing all available GPIO variable names, a GPO component file describing all available GPO names, an EINT component file describing all available EINT variable names, a ADC component file describing all available ADC variable names, and a keypad component file describing all logical key definitions used in software applications resident on an embedded system comprising the custom-designed chip.

FIG. 9 shows the content of an exemplary configuration file. The configuration file contains five sections Sec61 to Sec69, and a specific label name bracketed by square brackets is present at the beginning of each section, such as "[GPIO]", "[GPO]", "[EINT]", "[ADC]", or "[Keypad]". In the GPIO section Sec61, five statements Stat611 to Stat619 describe hardware configurations for GPIO pins. Each statement describes mode names of modes for a corresponding GPIO pin, and an initial idle state for the GPIO pin, such as pull-up (PU), pull-down (PD), or high-impedance (Z). For example, the statement Stat611 describes that a GPIO pin named by "GPIO0" corresponds to three modes from "Mode0" to "Mode2" respectively named by "GPIO0", "DICL" and "DSP_GPO3", and the initial idle state for the GPIO pin "GPIO0" is PD. In the GPO section Sec63, three statements Stat631 to Stat635 describe hardware configurations for GPO pins. Each statement describes mode names of modes for a corresponding GPO pin. It is to be understood that the mode name for a GPIO or GPO pin is bracketed by parentheses, and, parentheses containing no string for one mode represents that this mode is reserved. In the EINT section Sec65, a statement Stat651 describes a total number of external interrupt pins, and a statement S653 describes a total number of external interrupt pins using software debounce time delay. The software debounce time delay is employed to determine an interrupt threshold, and, when detecting that a state change on a corresponding interrupt pin, such as from high to low, or from low to high, remains for the determined interrupt threshold, an interrupt is recognized in order to avoid inaccurate recognition of interrupts due to the signal instability. In the ADC section Sec67, a statement Stat671 describes a total number of ADC channel pins. In the Keypad section Sec69, statements Stat691 and Stat693 describe keypad matrix of a hardware keypad. Specifically, the statements Stat691 and Stat693 respectively describe a total number of rows of the keypad matrix of the hardware keypad, and a total number of columns of the keypad matrix of the hardware keypad.

FIG. 10 shows the content of an exemplary GPIO component file. The GPIO component file contains five sections Sec71 to Sec79, and a specific label name bracketed by square brackets is present at the beginning of each section, such as "[GPIO_variables]", "[gpio_drv.h_HEADER]", "[gpio_drv.h_TAILER]", "[gpio_var.c_HEADER]", or "[gpio_var.c_TAILER]". The GPIO variable section Sec71 comprises GPIO variables used in software applications and can be assigned to a GPIO pin (i.e. a GPIO port number). Specifically, the GPIO variable section Sec71 contains variables Var711 to Var719 and comments Comm711 to Comm719 starting with a prefix ";". Each variable with a corresponding comment describes a GPIO variable used in software applications. For example, referring to Comm711 and Var711, a GPIO variable "gpio_bt_resetpin" is employed in software applications to indicate Bluetooth reset. Statements of the sections Sec73 to Sec79 describe headers and tailers inserted into two source files to be generated, such as "gpio_var.c" and "gpio_drv.h", and the source files comprises various settings for GPIO and GPO pins. The GPO component file can be deduced by the analogy, and only briefly described herein.

FIG. 11 shows the content of an exemplary GPIO component file. The GPIO component file contains five sections Sec81 to Sec89, and a specific label name bracketed by square brackets is present at the beginning of each section, such as "[EINT_variables]", "[eint_drv.h_HEADER]", "[eint_drv.h_TAILER]", "[eint_var.c_HEADER]", or "[eint_var.c_TAILER]". The EINT variable section Sec81 comprises EINT variables used in software applications and can be assigned to an EINT pin (i.e. an EINT port number). Specifically, the EINT variable section Sec81 contains variables Var811 to Var817 and comments Comm811 to Comm817 starting with a prefix ";". Each variable with a corresponding comment describes an EINT variable used in software applications. For example, referring to Comm813 and Stat813, an EINT variable "TOUCH_PANEL_EINT_NO" is employed in software applications to indicate touch panel interrupt. Statements of the sections Sec83 to Sec89 describe headers and tailers inserted into two source files to be generated, such as "eint_var.c" and "eint_drv.h", and the source files comprises various settings for EINT pins.

FIG. 12 shows the content of an exemplary ADC component file. The ADC component file contains three sections Sec91 to Sec95, and a specific label name bracketed by square brackets is present at the beginning of each section, such as "[ADC_variables]", "[adc_drv.c_HEADER]", or "[adc_var.c_TAILER]". The ADC variable section Sec91 comprises ADC variables used in software applications and can be assigned to an ADC pin (i.e. an ADC channel number). Specifically, the ADC variable section Sec91 contains variables Var911 to Var919 and comments Comm911 to Comm919 starting with a prefix ";". Each variable with a corresponding comment describes a GPIO variable used in software applications. For example, referring to Comm915 and Var915, an ADC variable "ADC_VBATTMP" is employed in software applications to indicate measure of battery temperature. Statements of the sections Sec93 to Sec95 describe headers and tailers inserted into a source file to be generated, such as "adc_var.c", and the source file comprises various settings for ADC pins.

FIG. 13 shows the content of an exemplary keypad component file. The keypad component file contains three sections Sec101 to Sec105, and a specific label name bracketed by square brackets is present at the beginning of each section, such as "[Key_definition]", "[keypad_drv.c_HEADER]", or "[keypad_var.c_TAILER]". The key definition section Sec101 comprises key definitions used in software applications and can be assigned to a position on the keypad matrix. Specifically, the key definition section Sec101 contains definitions Def1010 to Def101D. For example, referring to Def1010, a definition "DEVICE_KEY_0" is employed in software applications to indicate a hard key "0" on a keypad. Statements of the sections Sec103 to Sec105 describe headers and tailers inserted into a source file to be generated, such as "keypad_drv.h", and the source file comprises various settings for positions of the keypad matrix.

Figure 14A:
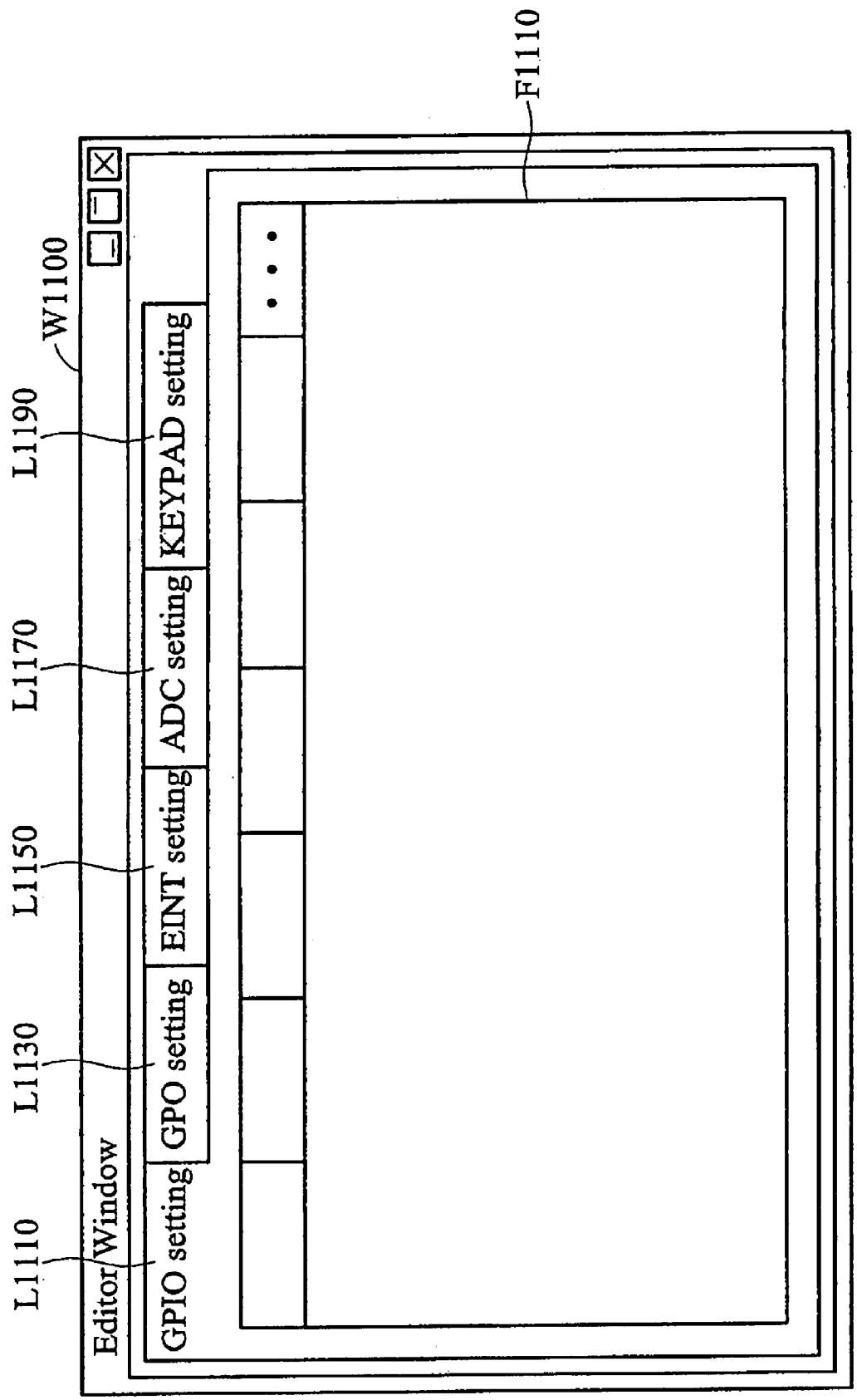
FIGS. 14a to 14e are diagrams illustrating exemplary generated GUIs in various aspects.
Figure 14B:
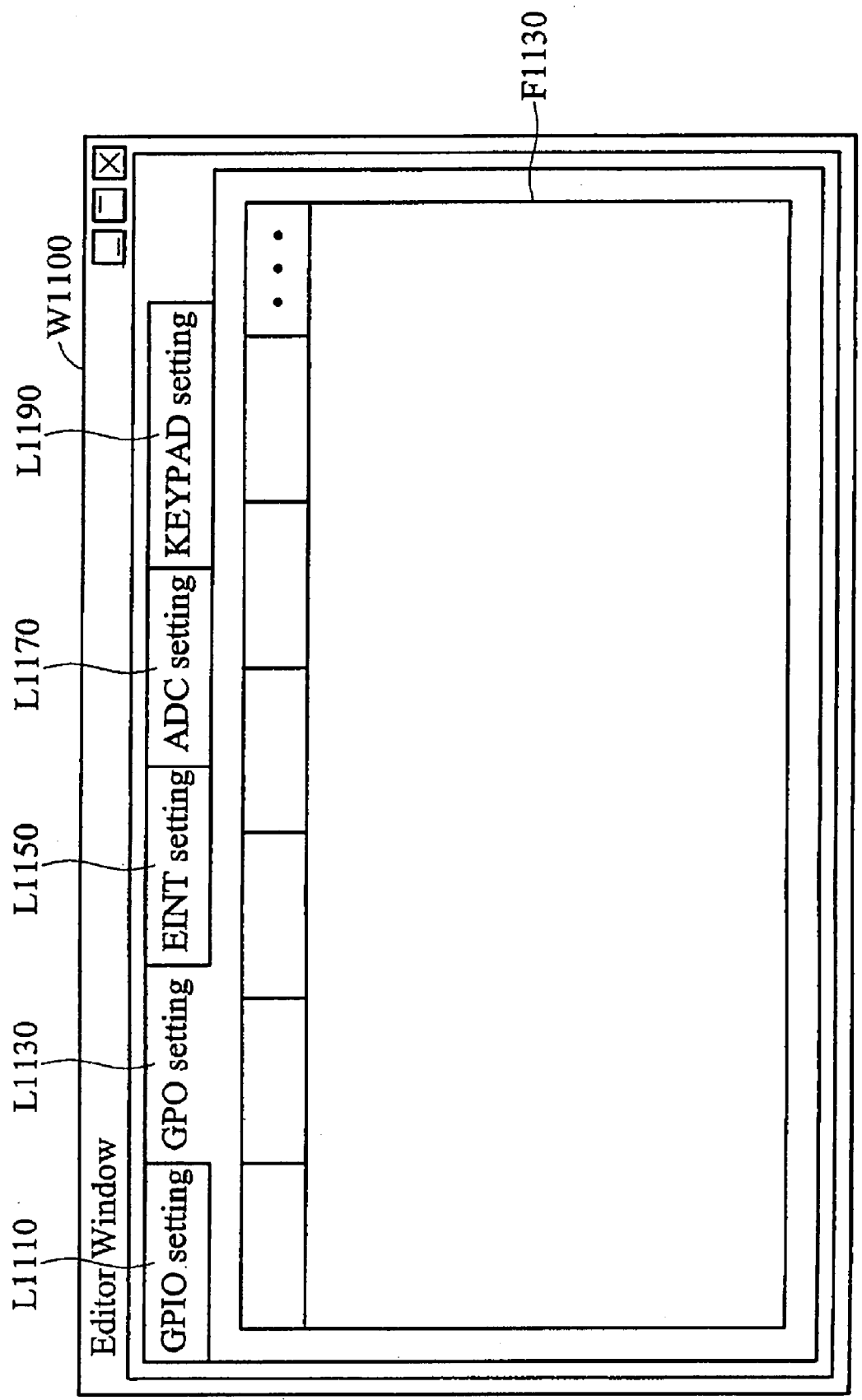
Figure 14C:
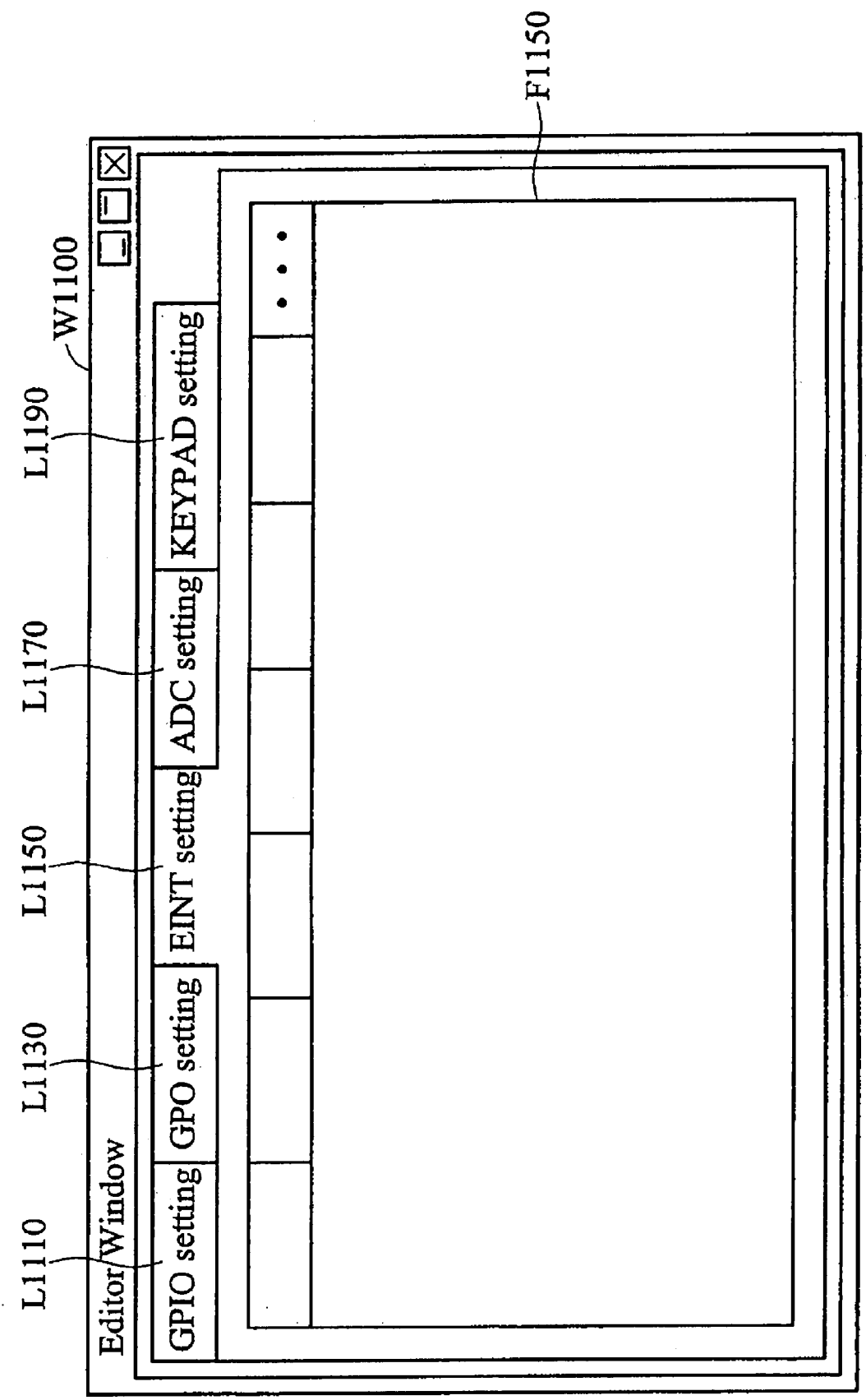
Figure 14D:
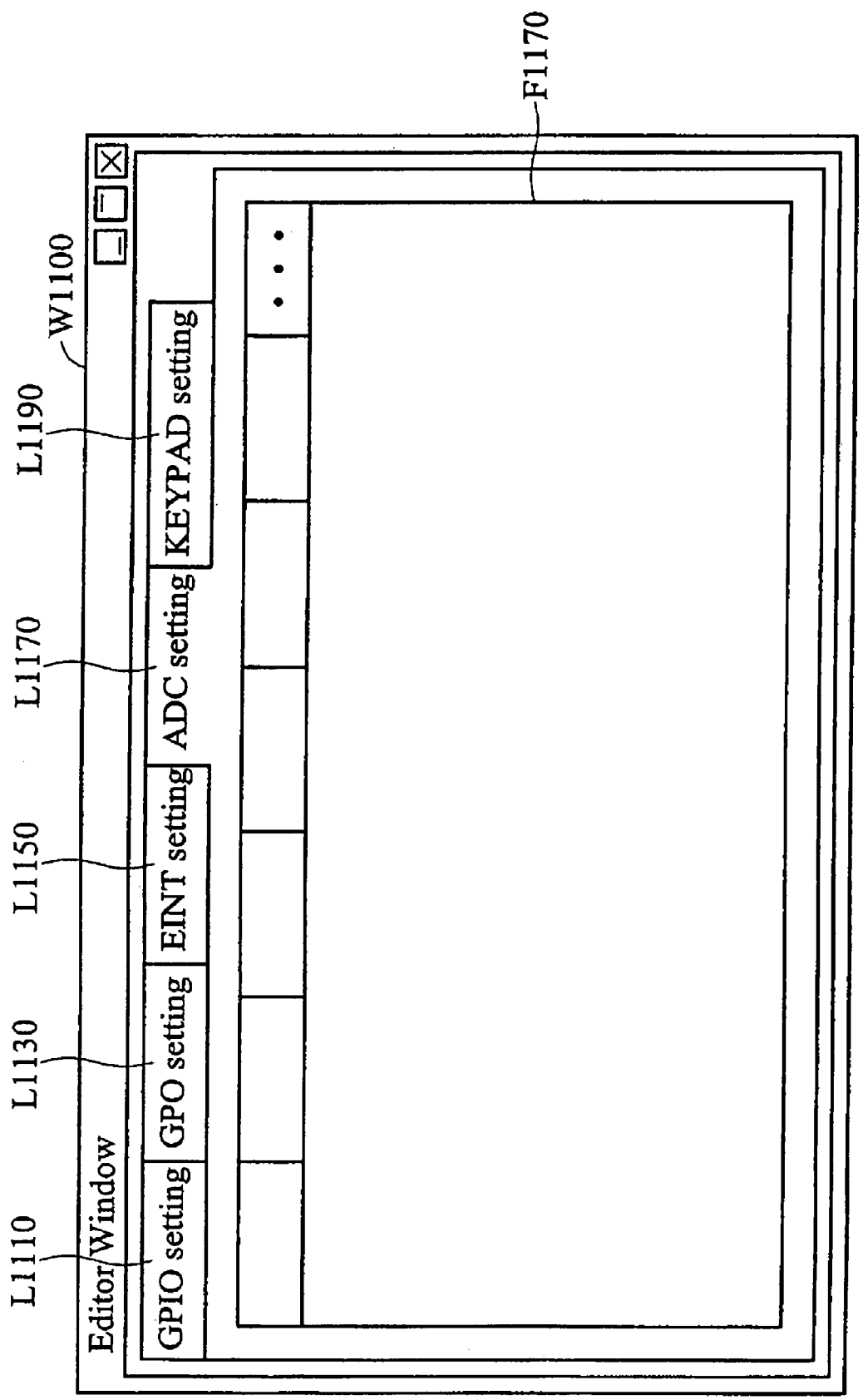
Figure 14E:
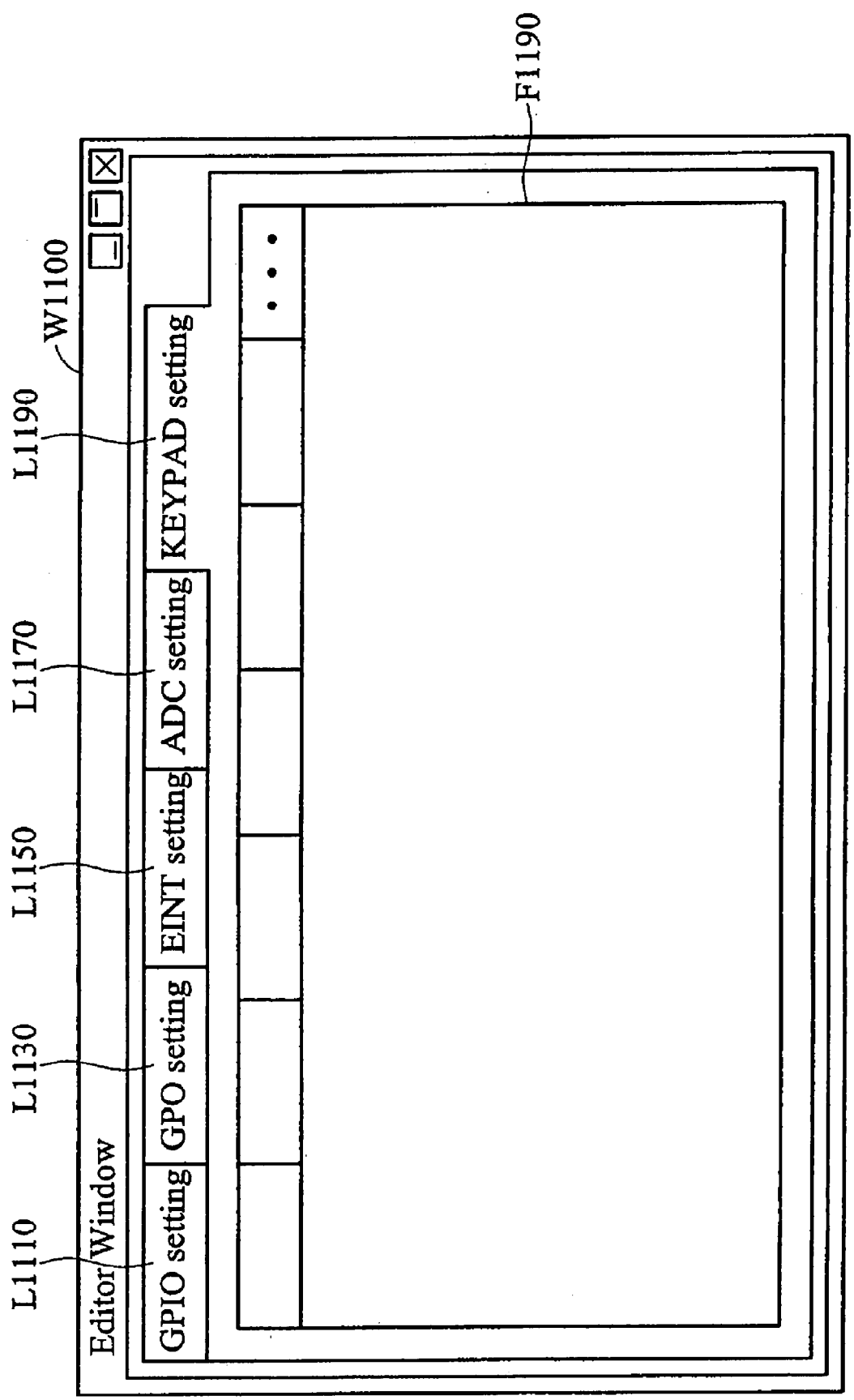

An interaction module 510 executed by the processing unit 41 loads and parses the described configuration file, and GPIO, EINT, ADC and Keypad component files, and generates a GUI according to the parsed results. FIGS. 14a to 14e are diagrams illustrating exemplary generated GUIs in various aspects. Referring to FIG. 14a, the generated GUI contains an editing window W1100, and the editing window W1100 contains five data forms respectively labeled "GPIO Setting" L1110, "GPO Setting" L1130, "EINT Setting" L1150, "ADC Setting" L1170, and "KEYPAD Setting" L1190. Each data form contains a data sheet facilitating users in editing configurations of GPIO, GPO, EINT, ADC or KEYPAD pins, and defining mappings between GPIO, GPO, EINT, ADC or KEYPAD pins and variables used in software applications. When the editing window W1100 is generated, a data sheet F1110 is initially appears, and, when a label of a data form is clicked, such as L1130, L1150, L1170 or L1190, a corresponding data sheet is displayed in the editing window W1100 and the initial data sheet F1110 is overlapped, the resulting GUI is shown in FIG. 14b, 14c, 14d, or 14e. Moreover, when a label of a data form is clicked, a data sheet of the data form is displayed in the editing window W1100, and the previously displayed data sheet is replaced.

A detailed description of generating the initial data sheet F1110 is provided in the following. The interaction module 510 parses a configuration file (referring to FIG. 9) to acquire hardware configurations for GPIO pins, such as a total number of GPIO pins, available modes with mode names, and initial idle state for each GPIO pin, and a GPIO component file (referring to FIG. 10) to acquire all GPIO variables used in software applications, and generates the data sheet F1110 according to the parsed results. FIG. 15 shows an exemplary data sheet of GPIO pins. The data sheet F1110 contains a data matrix of u rows and v columns, where u represents the parsed total number of GPIO pins, and v represents a total number of setting items. Each cell of the data matrix contains a UI (user interface) control, such as a drop down menu, a check box, an input field, or the similar, facilitating users in inputting configurations of a GPIO pin or mappings between a GPIO pin's mode and a GPIO variable. The data sheet F1110 can be conceptually divided into four main groups G1111, G1113, G1115, and G1117.

In the group G1111, for each row representing a particular GPIO pin, a mode drop down menu is generated facilitating users in selecting a default mode from available modes, and check boxes are generated facilitating users in enabling or disabling a particular mode. The mode drop down menu for a particular GPIO pin is initially filled with the parsed mode names and a proprietary keyword "NC" as menu items facilitating users in determining a default mode of the GPIO pin, or determine that the GPIO pin is not connected by selecting a menu item. FIG. 16 is a diagram illustrating an exemplary mode drop down menu M1300 containing five menu items "0:GPIO0", "1:DICL", "2:DSP_GPO3", "3:", and "NC" for a GPIO pin "GPIO0", where mode names "GPIO0", "DICL", and "DSP_GPO3" are parsed from the configuration file (referring to FIG. 9). When a menu item corresponding to a specific mode is selected, information indicating that the corresponding mode is the default mode of a GPIO pin is cached in the memory 42. When the menu item "NC" is selected, information indicating that a GPIO pin is not connected to any electronic devices is cached in the memory 42. Then, when the button B617 (FIG. 6) is pressed, a definition statement "#define GPIO_PORT0_MODE MODE_1" is generated and recorded in the source file "gpio_drv.h" to define that the default mode of a GPIO pin "GPIO0" is a mode "MODE_1" according to the cached information. Further, check boxes for available modes are initially displayed for each GPIO pin facilitating users in determining whether a particular mode is enabled. FIG. 17 is a diagram illustrating exemplary check boxes Chk141, Chk143, and Chk145 for the GPIO pin "GPIO0". Only three check boxes Chk141, Chk143, and Chk145 are displayed for the GPIO pin "GPIO0" because it is recognized that a mode "Mode3" is reserved when parsing the configuration file. A check box been checked (e.g. Chk141) indicates that a mode corresponding to the checked box is enabled, otherwise, an unchecked check box (e.g. Chk143 or Chk145) indicates that a mode corresponding to the checked box is disabled. When a check box is checked, information indicating that a specific mode for a GPIO pin is enabled is cached in the memory 42. When a check box is unchecked, information indicating that a specific mode for a GPIO pin is disabled is cached in the memory 42. Then, When the button B617 (FIG. 6), for example, is pressed, definition statements "#define MODE0_GPIO0 0" and "#define MODE1_GPIO0 1" are generated and recorded in the source file "gpio_drv.h" to define that a mode "MODE0" of a GPIO pin "GPIO0" is enabled, and a mode "MODE0" of a GPIO pin "GPIO0" is disabled according to the cached information.

Figure 18:
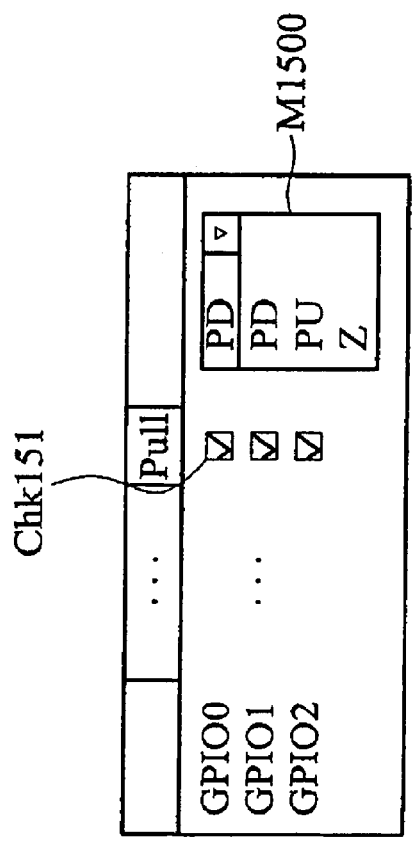
FIG. 18 is a diagram illustrating an exemplary state drop down menu.

In the group G1113, for each row representing a particular GPIO pin, a check box is generated facilitating users in enabling or disabling the initial idle state of the default mode of the GPIO pin, and a state drop down menu is generated facilitating users selecting an initial idle state from predefined states for the default mode of the GPIO pin. The state drop down menu for a particular GPIO pin is initially filled with predefined states "PD", "PU", and "Z" as menu items facilitating users in determining one state as an initial state of the GPIO pin. FIG. 18 is a diagram illustrating an exemplary state drop down menu M1500 and a check box Chk151 for a GPIO pin "GPIO0". The state drop down menu M1500 contains three predefined menu items "PD", "PU", and "Z", and the menu item "PD" is initially selected for the GPIO pin "GPIO0" when parsing the configuration file (referring to FIG. 9). The checked box Chk151 and the selected menu item "PD" indicate that an initial state of the GPIO pin "GPIO0" is pull-down. When a check box is checked, information indicating that an initial state of the default mode of the GPIO pin is enabled is cached in the memory 42. When the check box is unchecked, information indicating that an initial state of the default mode of the GPIO pin is disabled is cached in the memory 42. When a menu item corresponding to a state is selected, information indicating that the default state of the default mode of a GPIO pin is the corresponding state is cached in the memory 42. Then, when the button B617 (FIG. 6) is pressed, a definition statement "#define GPIO_PORT0_PULL PULL_ENABLE" is generated and recorded in the source file "gpio_drv.h" to define that an initial state of the default mode of an GPIO pin "GPIO0" is enabled according to the cached information.

Figure 19:
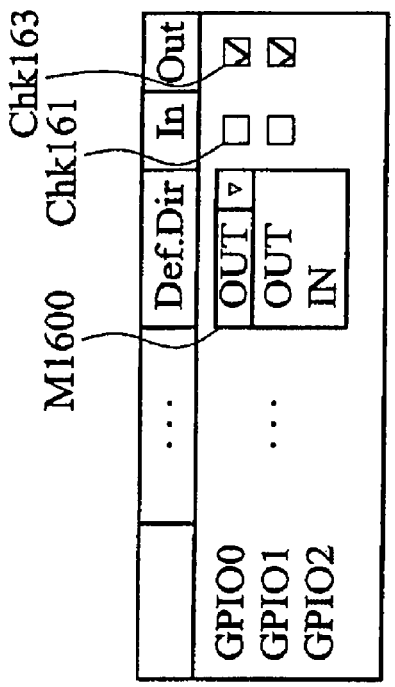
FIG. 19 is a diagram illustrating two exemplary check boxes and an exemplary direction drop down menu.

In the group G1115, for each row representing a particular GPIO pin, a direction drop down menu is generated facilitating users in selecting a default direction from predefined directions, and two check boxes are generated facilitating users in enabling or disabling signal input or output for the GPIO pin. The direction drop down menu for a particular GPIO pin is initially filled with predefined directions "IN", and "OUT" as menu items facilitating users in determining a default direction of the GPIO pin. FIG. 19 is a diagram illustrating two exemplary check boxes Chk161 and Chk163, and an exemplary direction drop down menu M1600 for a GPIO pin "GPIO0". The checked box Chk161 and the selected menu item "OUT" indicate that the GPIO pin "GPIO0" outputs signals to an electronic device, and the default direction thereof is output. When a check box is checked, information indicating that signal input or output for the GPIO pin is enabled is cached in the memory 42. When a check box is unchecked, information indicating that signal input or output for the GPIO pin is disabled is cached in the memory 42. When a menu item corresponding to a direction is selected, information indicating that the default direction of a GPIO pin is the corresponding direction is cached in the memory 42. Then, when the button B617 (FIG. 6) is pressed, definition statements "#define GPIO_PORT0_DIR DIR OUT", "#define DIR_IN_GPIO0 0", and "#define GPIO_PORT_OUT_GPIO0 1" are generated and recorded in the source file "gpio_drv.h" to define that the default direction of the default mode of an GPIO pin "GPIO0" is output, the signal input for the GPIO pin is disabled, and the signal output for the GPIO pin is enabled according to the cached information. In addition to the described definition statements, the headers and tailers (referring to Sec73 and Sec75 of FIG. 10) are further recorded in the source file "gpio_drv.h" when the button B617 (FIG. 6) is pressed.

In the group G1117, for each row representing a particular GPIO pin, four variable drop down menu respectively corresponding to four modes of the GPIO pin are generated facilitating users in selecting one GPIO variable from the parsed GPIO variables used in software applications. The variable drop down menu for a mode of a particular GPIO pin is initially filled with the parsed GPIO variable names as menu items facilitating users in determining a mapping between the mode of the GPIO pin and one GPIO variable. FIG. 20 is a diagram illustrating an exemplary variable drop down menu M1700 containing at least five menu items "gpio_led_status_en_pin", "gpio_led_status1_en_pin", "gpio_led_status2_en_pin", "gpio_led_status3_en_pin", and "gpio_led_keybl_en_pin" for a mode "Mode0" of a GPIO pin "GPIO0", where the GPIO variable names "gpio_led_status_en_pin", "gpio_led_status1_en_pin", "gpio_led_status2_en_pin", "gpio_led_status3_en_pin", and "gpio_led_keybl_en_pin" are parsed from the GPIO component file (referring to FIG. 10). When a GPIO variable name is selected, information indicating that a mode of a GPIO pin is mapped to the selected GPIO variable name is cached in the memory 42. Then, when the button B617 (FIG. 6) is pressed, a declaration statement "const char gpio_flash_test_cmd_bit0_pin=GPIO_PORT_8;" is generated and recorded in the source file "gpio_var.c" to declare that a GPIO variable "gpio_flash_test_cmd_bit0_pin" used in software applications is a GPIO port number "GPIO_PORT_8" used in firmware for a custom-designed chip according to the cached information. In addition to the described declaration statements, the headers and tailers (referring to Sec77 and Sec79 of FIG. 10) are further recorded in the source file "gpio_var.c" when the button B617 (FIG. 6) is pressed.

A detailed description of generating the initial data sheet F1130 is provided in the following. The interaction module 510 parses a configuration file (referring to FIG. 9) to acquire hardware configurations for GPO pins, such as a total number of GPO pins, and available modes with mode names, and a GPO component file to acquire all GPO variables used in software applications, and generates the data sheet F1130 according to the parsed results. FIG. 21 is a diagram of an exemplary data sheet of GPO pins. The data sheet F1130 contains a data matrix of u rows and v columns, where u represents the parsed total number of GPO pins, and v represents a total number of setting items. Each cell of the data matrix contains a UT control, such as a drop down menu, a check box, an input field, or the similar, facilitating users in inputting configurations of a GPO pin or mappings between a mode of a GPO and a GPO variable. The data sheet F1130 can be conceptually divided into two main groups G1131, and G1133.

In the group G1131, for each row representing a particular GPO pin, a mode drop down menu is generated facilitating users in selecting a default mode from available modes, and check boxes are generated facilitating users in enabling or disabling a particular mode. The mode drop down menu for a particular GPO pin is initially filled with the parsed mode names and a proprietary keyword "NC" as menu items facilitating users in determining a default mode of the GPO pin, or determine that the GPO pin is not connected by selecting a menu item. Detailed description of generation and manipulation of the drop down menu may follow the description of FIG. 16. A maximum of four check boxes for available modes are initially displayed for each GPO pin facilitating users in determining whether a particular mode is enabled. Detailed description of generation and manipulation of the check boxes may follow the description of FIG. 17.

In the group G1117, for each row representing a particular GPO pin, four variable drop down menus respectively corresponding to four modes of the GPO pin are generated facilitating users in selecting one GPO variable from the parsed GPO variables used in software applications. The variable drop down menu for a mode of a particular GPO pin is initially filled with the parsed GPO variable names as menu items facilitating users in determining a mapping between the mode of the GPIO and one GPO variable. Detailed description of generation and manipulation of the variable drop down menu may follow the description of FIG. 20.

A detailed description of generating the initial data sheet F1150 is described in the following. The interaction module 510 parses a configuration file (referring to FIG. 9) to acquire hardware configurations for EINT pins, such as a total number of EINT pins, and an EINT component file (referring to FIG. 11) to acquire all EINT variables used in software applications, and generates the data sheet F1150 according to the parsed results. FIG. 22 is a diagram of an exemplary data sheet of EINT pins. The data sheet F1150 contains a data matrix of u rows and v columns, where u represents the parsed total number of EINT pins, and v represents a total number of setting items. Each cell of the data matrix contains a UI control, such as a drop down menu, a check box, an input field, or the similar, facilitating users in inputting configurations of an EINT pin or mappings between an EINT pin (represented by EINT port number) and an EINT variable. The data sheet F1150 can be conceptually divided into two main groups G1151, and G1153.

In the group G1511, for each row representing a particular EINT pin, a variable drop down menu corresponding to an EINT pin (represented by an EINT port number) is generated facilitating users in selecting one EINT variable from the parsed EINT variables used in software applications. The variable drop down menu for a particular EINT pin is initially filled with the parsed EINT variable names and a proprietary keyword "NC" as menu items facilitating users in determining a mapping between the BINT pin and one EINT variable. FIG. 23 is a diagram illustrating an exemplary variable drop down menu M2000 containing at least nine menu items "SWBDG_EINT_NO", "AUX_EINT_NO", "TOUCH_PANEL_EINT_NO", "CHRDET_EINT_NO", "MOTION_SENSOR_EINT_NO", "BT_EINT_NO", "USB_EINT_NO", "CHR_USB_EINT_NO", and "NC" for an EINT pin "EINT0", where the EINT variable names "SWBDG_EINT_NO", "AUX_EINT_NO", "TOUCH_PANEL_EINT_NO", "CHRDET_EINT_NO", "MOTION_SENSOR_EINT_NO", "BT_EINT_NO", "USB_EINT_NO", and "CHR_USB_EINT_NO", are parsed from the EINT component file (referring to FIG. 11). When an EINT variable name is selected, information indicating that an EINT pin (represented by an EINT port number) is mapped to the selected EINT variable name is cached in the memory 42. When the menu item "NC" is selected, information indicating that an EINT pin is not connected to any electronic devices is cached in the memory 42. Then, when, for example, the button B617 (FIG. 6) is pressed, declaration statements "const unsigned char AUX_EINT_NO=0;", "const unsigned char TOUCH_PANEL_EINT_NO=1;", "const unsigned char SWDBG_EINT_NO=EINT_CHANNEL_NOT_EXIST;" and "const unsigned char MOTION_SENSOR_EINT_NO=EINT_CHANNEL_NOT_EXIST;" are generated and recorded in the source file "eint_var.c" to respectively declare that an EINT number "0" used in firmware is assigned to an EINT variable "AUX_EINT_NO" used in software applications, an EINT number "1" used in firmware is assigned to an EINT variable "TOUCH_PANEL_EINT_NO" used in software applications, and proprietary constants "EINT_CHANNEL_NOT_EXIST" are assigned to EINT variables "SWDGE_EINT_NO" and "MOTION_SENSOR_EINT_NO" according to the cached information. Note that, an EINT variable assigning the constant "EINT_CHANNEL_NOT_EXIST" indicates that the EINT variable does not map to any EINT numbers. In addition to the described declaration statements, the headers and tailers (referring to Sec87 and Sec89 of FIG. 11) are further recorded in the source file "eint_var.c" when the button B617 (FIG. 6) is pressed.

Figure 24:
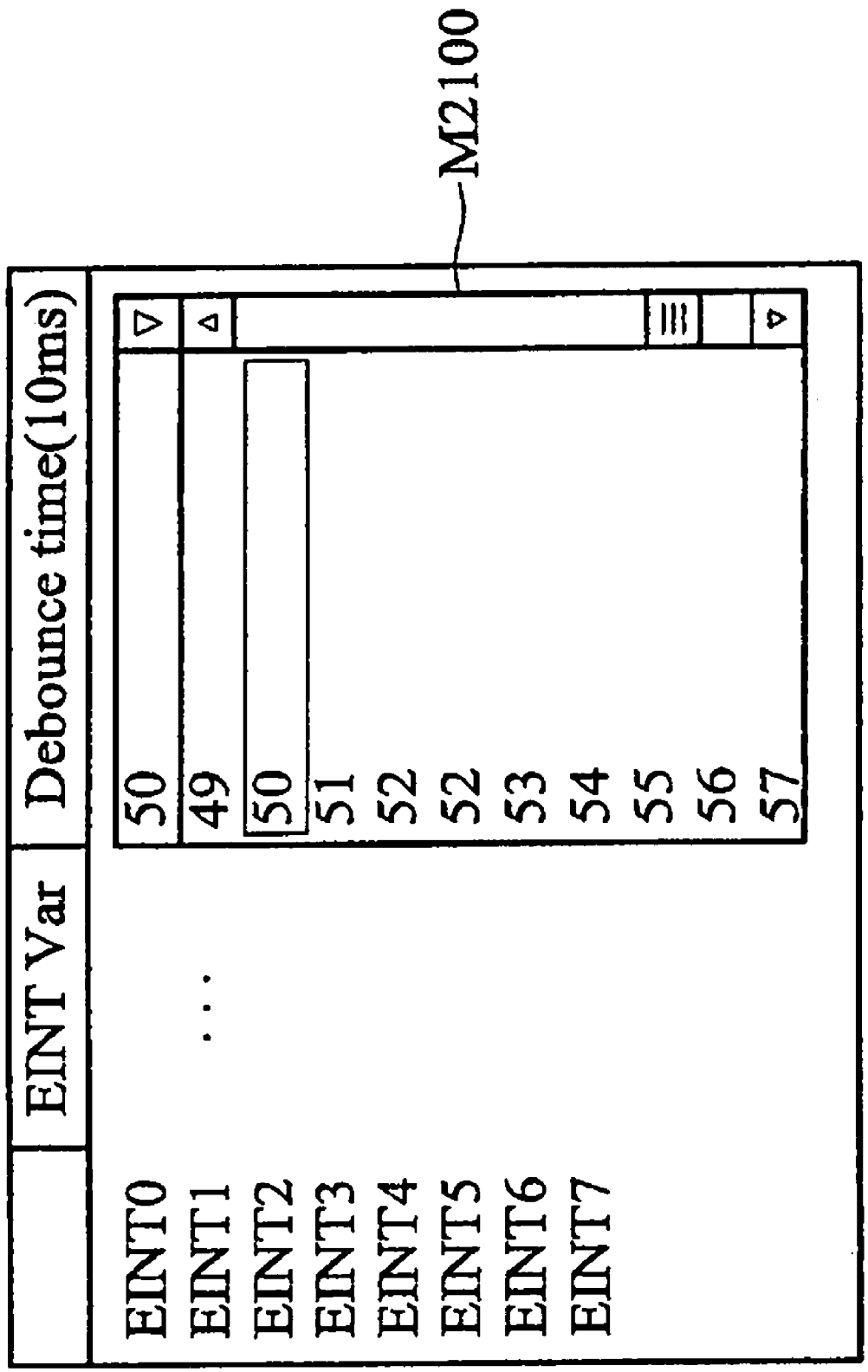
FIG. 24 is a diagram illustrating an exemplary debounce time drop down menu.

In the group G1153, for each row representing a particular EINT pin, a debounce time drop down menu corresponding to an EINT pin is generated facilitating users in selecting one debounce time from predefined debounce times. The debounce time drop down menu for a particular EINT pin is initially filled with predefined numbers as menu items facilitating users in determining one debounce time for the EINT pin. FIG. 24 is a diagram illustrating an exemplary debounce time drop down menu M2100 for an EINT pin "EINT0". The debounce time drop down menu M2100 contains at least nine predefined menu items from "49" to "57". Then, when the button B617 (FIG. 6) is pressed, definition statements "#define EINT0_DEBOUNCE_TIME_DELAY 50", and "#define EINT1_DEBOUNCE_TIME_DELAY 0" are generated and recorded in the source file "eint_drv.h" to define that the debounce time delay of an EINT pin with an EINT number "0" is 50 by 10 milliseconds (ms), and the debounce time delay of an EINT pin with an EINT number "1" is 0 according to the cached information. In addition to the described definition statements, the headers and tailers (referring to Sec83 and Sec85 of FIG. 11) are further recorded in the source file "eint_drv.h" when the button B617 (FIG. 6) is pressed.

A detailed description of generating the initial data sheet F1170 is described in the following. The interaction module 510 parses a configuration file (referring to FIG. 9) to acquire hardware configurations for ADC pins, such as a total number of ADC pins, and a ADC component file (referring to FIG. 12) to acquire all ADC variables used in software applications, and generates the data sheet F1170 according to the parsed results. FIG. 25 is a diagram of an exemplary data sheet of ADC pins. The data sheet F1170 contains a data matrix of u rows and v columns, where u represents the parsed total number of ADC pins, and v represents a total number of setting items. Each cell of the data matrix contains a UI control, such as a drop down menu, a check box, an input field, or the similar, facilitating users in inputting mappings between an ADC pin (represented by ADC channel number) and an ADC variable. The data sheet F1170 can be conceptually divided into at least main groups G1171.

Figure 26:
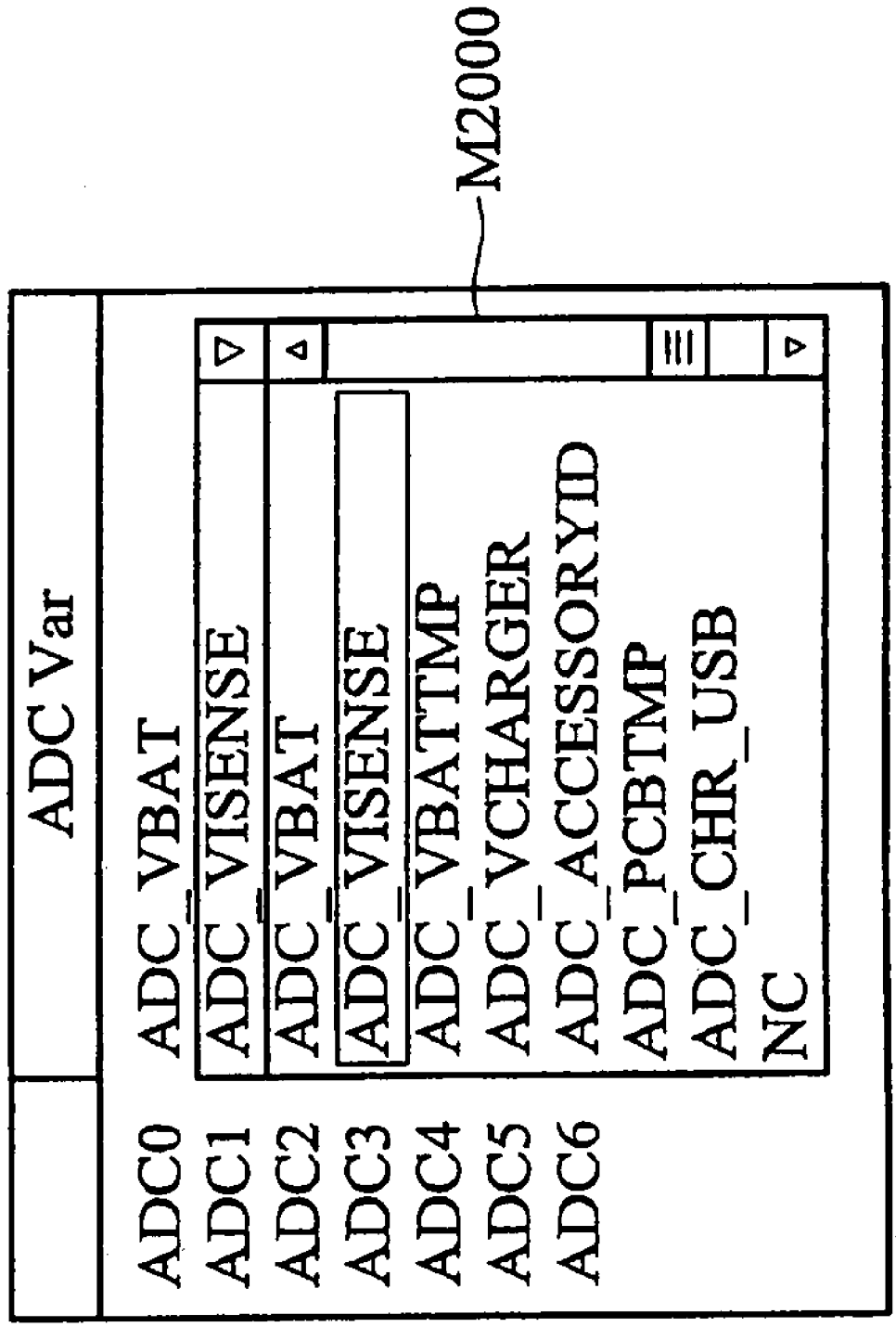
FIG. 26 is a diagram illustrating an exemplary variable drop down menu.

In the group G1711, for each row representing a particular ADC pin, a variable drop down menu corresponding to an ADC pin (represented by an ADC channel number) is generated facilitating users in selecting one ADC variable from the parsed ADC variables used in software applications. The variable drop down menu for a particular ADC pin is initially filled with the parsed ADC variable names and a proprietary keyword "NC" as menu items facilitating users in determining a mapping between the ADC pin and one ADC variable. FIG. 26 is a diagram illustrating an exemplary variable drop down menu M2300 containing at least eight menu items "ADC_VBAT", "ADC_VISENSE", "ADC_VBATTMP", "ADC_VCHARGER", "ADC_ACCESSORYID", "ADC_PCBTMP", "ADC_CHR_USB", and "NC" for an ADC pin "ADC1", where the ADC variable names "ADC_VBAT", "ADC_VISENSE", "ADC_VBATTMP", "ADC_VCHARGER", "ADC_ACCESSORYID", "ADC_PCBTMP", and "ADC_CHR_USB", are parsed from the ADC component file (referring to FIG. 12). When an ADC variable name is selected, information indicating that an ADC pin (represented by an ADC channel number) is mapped to the selected ADC variable name is cached in the memory 42. When the menu item "NC" is selected, information indicating that an ADC pin is not connected to any electronic devices is cached in the memory 42. Then, Then, when the button B617 (FIG. 6) is pressed, declaration statements "const unsigned char ADC_VBAT=0;", "const unsigned char ADC_VISENSE=1;" and "const unsigned char ADC_PCBTMP=ADC_ERR_CHANNEL_NO;" are generated and recorded in the source file "adcvar.c" to respectively declare that an ADC channel "0" used in firmware is assigned to an ADC variable "ADC_VBAT" used in software applications, an ADC channel "1" used in firmware is assigned to an ADC variable "ADC_VISENSE" used in software applications, and a proprietary constant "ADC_ERR_CHANNEL_NO" is assigned to an ADC variable "ADC_PCBTMP" according to the cached information. Note that, an ADC variable assigning the constant "DC_ERR_CHANNEL_NO" indicates that the ADC variable does not map to any ADC channel numbers. In addition to the described declaration statements, the headers and tailers (referring to Sec93 and Sec95 of FIG. 12) are further recorded in the source file "adc_var.c" when the button B617 (FIG. 6) is pressed.

A detailed description of generating the initial data sheet F1190 is provided in the following. The interaction module 510 parses a configuration file (referring to FIG. 9) to acquire hardware configurations for keypad pins, such as a total number of rows of the keypad matrix of the hardware keypad, and a total number of columns of the keypad matrix of the hardware keypad, and a keypad component file (referring to FIG. 13) to acquire all key definitions used in software applications, and generates the data sheet F1190 according to the parsed results. FIG. 27 is a diagram of an exemplary data sheet of keypad pins. The data sheet F1190 contains a data matrix of u rows and v columns, where u represents the parsed total number of rows of keypad matrix, and v represents the parsed total number of columns of keypad matrix. Each cell of the data matrix contains a UI control, such as a drop down menu, a check box, an input field, or the similar, facilitating users in inputting mappings between a position of a keypad matrix and a key definition. The data sheet F1190 can be conceptually divided into at least main groups G1191.

In the group G1911, for each cell of the data matrix, a definition drop down menu corresponding to a position of the keypad matrix is generated facilitating users in selecting one key definition from the parsed key definitions used in software applications. The definition drop down menu for a position of the keypad matrix is initially filled with the parsed key definitions and a proprietary keyword "NONE" as menu items facilitating users in determining a mapping between a position of the keypad matrix and one key definition. FIG. 28 is a diagram illustrating an exemplary definition drop down menu M2500 containing at least eleven menu items "DOWN", "LEFT", "RIGHT", "MENU", "FUNCTION", "SK_LEFT", "SK_RIGHT", "SEND", "END", "POWER", and "NONE" for a cell with the column 1 of the row 2 of the keypad matrix, where the key definitions "DOWN", "LEFT", "RIGHT", "MENU", "FUNCTION", "SK_LEFT", "SK_RIGHT", "SEND", "END", "POWER", are parsed from the keypad component file (referring to FIG. 13). Note that the key definition shown in the definition drop down menu is a reduced string of the original key definition stored in the keypad component file (referring to FIG. 10). When a key definition is selected, information indicating that a position of the keypad matrix is mapped to the selected key definition is cached in the memory 42. When the menu item "NONE" is selected, information indicating that a position of the keypad matrix is not defined is cached in the memory 42. Then, when the button B617 (FIG. 6), for example, is pressed, a definition statement "#define KEYPAD_MAPPING DEVICE_KEY_SEND, DEVICE_KEY_SK_RIGHT, DEVICE_KEY_NONE, DEVICE_KEY_FUNCTION, . . ." is generated and recorded in the source file "keypad_drv.h" to define that key definitions used in software applications are respectively and sequentially mapped to positions of the keypad matrix according to the cached information. Note that, a position of the keypad matrix mapped by a proprietary constant "DEVICE_KEY_NONE" indicates that the position of the keypad matrix is not mapped (i.e. the position of the keypad matrix is reserved). In addition to the described definition statements, the headers and tailers (referring to Sec103 and Sec105 of FIG. 10) are further recorded in the source file "keypad_drv.h" when the button B617 (FIG. 6) is pressed.

Methods for creating embedded target images, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a mobile phone, a computer, a DVD recorder or the like, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a mobile phone, a computer or the like, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for generating an embedded target image to be stored in a non-volatile memory device of an embedded system as firmware thereof, comprising:
    acquiring at least one available mode for each of a plurality of general purpose input output (GPIO) pins by parsing a configuration file;
    acquiring at least one mode name corresponding to the available mode for each GPIO pin by parsing the configuration file;
    acquiring an initial idle state for a default mode of each GPIO pin;
    acquiring a plurality of GPIO variables used in a software application by parsing a GPIO component file;
    generating a graphical user interface (GUI) editor according to the acquisitions to facilitate a user in providing settings information for the GPIO pins of a chip installed in the embedded system, wherein generating a GUI editor further comprises:
        generating a data sheet of u rows and v columns in the GUI editor;
        generating a mode drop down menu comprising at least one menu item corresponding to the acquired mode name for each row, thereby facilitating the user in determining default mode of the GPIO pin by selecting one menu item;
        generating at least one check box corresponding to the acquired available mode for each row, thereby facilitating the user in enabling one mode of the GPIO in by checking one check box;
        generating a check box, thereby facilitating the user in enabling an initial idle state for the default mode of the GPIO in by checking the check box;
        generating a state drop down menu comprising a plurality of predefined states, thereby facilitating the user in determining the initial idle state for the default mode of the GPIO in by selecting one menu item; and
        generating at least one variable drop down menu corresponding to the available mode of the GPIO pin, comprising a plurality of menu items corresponding to the acquired GPIO variables, thereby facilitating the user in determining mapping between one available mode of the GPIO in and one GPIO variable by selecting one menu item,
    generating source code in response to operating results of the GUI editor by the user; and
    generating the embedded target image by linking an object file compiled from the generated source code.

2. The method as claimed in claim 1 wherein the provided information comprises configurations for the pins, and a plurality of mappings for the pins and a plurality of variables used in a software application resident on the embedded system.

3. The method as claimed in claim 1,
    wherein the configuration or GPIO component file comprising a plurality of statements describing hardware configurations for the GPIO pins of the chip, and a plurality of variables used in the software application resident on the embedded system.

4. The method as claimed in claim 1, further comprising acquiring a total number of the GPIO pins by parsing the configuration file, wherein u equals the acquired total number of the GPIO pins.

5. The method as claimed in claim 1 wherein the generating step for the GUI editor further comprises:

generating a direction drop down menu comprising two predefined menu items, facilitating the user in determining default direction of the GPIO pin by selecting one menu item; and generating two check boxes facilitating the user to enabling or disabling signal input or output by checking or unchecking one check box.

6. A system for generating an embedded target image to be stored in a non-volatile memory device of an embedded system as firmware thereof, comprising:

a display; and a processing unit coupling to the display, the processing unit configured to execute instructions causing the system to:

acquire at least one available mode for each of a plurality of GPIO (general purpose input output) pins by parsing a configuration file, acquire at least one mode name corresponding to the available mode for each GPIO in by parsing the configuration file, acquire an initial idle state for a default mode of each GPIO pin, acquiring a plurality of GPIO variables used in a software application by parsing a GPIO component file, generate a graphical user interface (GUI) editor according to the acquisitions and display the generated GUI editor on the display to facilitate a user in providing settings information for the GPIO pins of a chip installed in the embedded system, generate source code in response to operating results of the GUI editor by the user, and generate the embedded target image by linking an object file compiled from the generated source code, wherein the generation of the GUI editor further comprises generating a data sheet of u rows and v columns in the GUI editor, generate a mode drop down menu comprising at least one menu item corresponding to the acquired mode name for each row, thereby facilitating the user in determining default mode of the GPIO in by selecting one menu item, generate at least one check box corresponding to the acquired available mode for each row, thereby facilitating the user in enabling one mode of the GPIO in by checking one check box, generate a check box, thereby facilitating the user in enabling an initial idle state for the default mode of the GPIO in by checking the check box, generate a state drop down menu comprising a plurality of predefined states, thereby facilitating the user in determining the initial idle state for the default mode of the GPIO in by selecting one menu item, and generate at least one variable drop down menu corresponding to the available mode of the GPIO pin, comprising a plurality of menu items corresponding to the acquired GPIO variables, thereby facilitating the user in determining mapping between one available mode of the GPIO in and one GPIO variable by selecting one menu item.

7. The system as claimed in claim 6 wherein the provided information comprises configurations for the pins, and a plurality of mappings for the pins and a plurality of variables used in a software application resident on the embedded system.

8. The system as claimed in claim 7 further comprising a memory device, wherein the processing unit is configured to cache the provided information in the memory device, record the provided information in a data workspace file stored in a storage device, and the data workspace file is to be later retrieved to acquire the provided information.

9. The system as claimed in claim 6 further comprising a storage device storing the configuration or GPIO component file comprising a plurality of statements describing hardware configurations for the GPIO pins of the chip, and a plurality of variables used in the software application resident on the embedded system.

10. The system as claimed in claim 6 further comprising a storage device, wherein the processing unit stores the generated source code in the storage device.

11. A system for generating an embedded target image to be stored in a non-volatile memory device of an embedded system as firmware thereof, comprising:

a display; and a processing unit coupling to the display, the processing unit being configured to execute instructions causing the system to:

acquire at least one available mode for each of a plurality of GPO (general purpose output) pins by parsing a configuration file, acquire at least one mode name corresponding to the available mode for each GPO pin by parsing the configuration file, acquire a plurality of GPO variables used in a software application by parsing a GPIO component file, generate a graphical user interface (GUI) editor according to the acquisitions and displaying the generated GUI editor on the display to facilitate a user in providing settings information for the GPO pins of a chip installed in the embedded system, generate source code in response to operating results of the GUI editor by the user, and generate the embedded target image by linking an object file compiled from the generated source code, wherein the generation of the GUI editor further comprises the processing unit being further configured to execute instructions causing the system to:

generate a first data sheet of a plurality of first rows and a plurality of first columns in the GUI editor, generate a mode drop down menu comprising at least one menu item corresponding to the acquired mode name for each first row, thereby facilitating the user in determining default mode of the GPO pin by selecting one menu item, generate at least one check box corresponding to the acquired available mode for each first row, thereby facilitating the user in enabling one mode of the GPO pin by checking one check box, and generate at least one variable drop down menu corresponding to the available mode of the GPO pin, comprising a plurality of menu items corresponding to the acquired GPO variables, thereby facilitating the user in determining mapping between one available mode of the GPO pin and one GPO variable by selecting one menu item.

12. The system as claimed in claim 11, wherein the processing unit further acquires a total number of a plurality of EINT (external interrupt) pins by parsing the configuration file, and generates and displays a second data sheet of a plurality of second rows and a plurality of second columns in the GUI editor.

13. The system as claimed in claim 11, wherein the processing unit is configured to further execute instructions causing the system to acquire a total number of a plurality of ADC (analog-to-digital) pins by parsing the configuration file, and generate and displays a second data sheet of a plurality of second rows and a plurality of second columns in the GUI editor.

14. The system as claimed in claim 11, wherein the processing unit is configured to further execute instructions causing the system to acquire a total number of rows of a keypad matrix of a hardware keypad, and a total number of columns of the keypad matrix of the hardware keypad by parsing the configuration file, and generate and displays a second data sheet of a plurality of second rows and a plurality of second columns in the GUI editor.

15. A method for generating an embedded target image to be stored in a non-volatile memory device of an embedded system as firmware thereof, comprising:

acquiring at least one available mode for each of a plurality of general purpose output (GPO) pins by parsing a configuration file;

acquiring at least one mode name corresponding to the available mode for each GPO pin by parsing the configuration file;

acquiring a plurality of GPO variables used in a software application by parsing a GPO component file;

generating a graphical user interface (GUI) editor according to the acquisitions to facilitate a user in providing settings information for the GPO pins of a chip installed in the embedded system, further comprising:

generating a data sheet of a plurality of rows and a plurality of columns in the GUI editor;

generating a mode drop down menu comprising at least one menu item corresponding to the acquired mode name for each row, thereby facilitating the user in determining default mode of the GPO pin by selecting one menu item;

generating at least one check box corresponding to the acquired available mode for each row, thereby facilitating the user in enabling one mode of the GPO pin by checking one check box; and generating at least one variable drop down menu corresponding to the available mode of the GPO pin, comprising a plurality of menu items corresponding to the acquired GPO variables, thereby facilitating the user in determining mapping between one available mode of the GPO pin and one GPO variable by selecting one menu item, generating source code in response to operating results of the GUI editor by the user; and generating the embedded target image by linking an object file compiled from the generated source code.

16. The method as claimed in claim 15, further comprising acquiring a total number of a plurality of EINT (external interrupt) pins by parsing the configuration file, wherein the GUI editor generating step further comprises generating a data sheet of u rows and v columns in the GUI editor, and u equals the acquired total number of the EINT pins.

17. The method as claimed in claim 16 wherein each row of the data sheet represents one EINT pin, the method further comprising acquiring a plurality of EINT variables used in the software application by parsing an EINT component file, and the generating step for the GUI editor further comprises generating a variable drop down menu corresponding to one EINT pin, comprising a plurality of menu items corresponding to the acquired EINT variables, facilitating the user in determining mapping between one EINT pin and one EINT variable by selecting one menu item.

18. The method as claimed in claim 17 wherein the generating step for the GUI editor further comprises generating a debounce time drop down menu corresponding to one EINT pin, comprising a plurality of predefined debounce times as menu items, facilitating the user in determining one debounce time for the EINT pin by selecting one menu item.

19. The method as claimed in claim 15, further comprising acquiring a total number of a plurality of ADC (analog-to-digital) pins by parsing the configuration file, the GUI editor generating step further comprises generating a data sheet of u rows and v columns in the GUI editor, and u equals the acquired total number of the ADC pins.

20. The method as claimed in claim 19 wherein each row of the data sheet represents one ADC pin, the method further comprising acquiring a plurality of ADC variables used in the software application by parsing an ADC component file, and the generating step for the GUI editor further comprises generating a variable drop down menu corresponding to one ADC pin, comprising a plurality of menu items corresponding to the acquired ADC variables, facilitating the user in determining mapping between one ADC pin and one ADC variable by selecting one menu item.

21. The method as claimed in claim 15, further comprising acquiring a total number of rows of a keypad matrix of a hardware keypad, and a total number of columns of the keypad matrix of the hardware keypad by parsing the configuration file, the GUI editor generating step further comprises generating a data sheet of u rows and v columns in the GUI editor, u equals the acquired total number of the rows of the keypad matrix of the hardware keypad, and v equals the acquired total number of the columns of the keypad matrix of the hardware keypad.

22. The method as claimed in claim 21 wherein each row of the data sheet represents one row of the keypad matrix, each column of the data sheet represents one column of the keypad matrix, the method further comprising acquiring a plurality of key definitions used in the software application by parsing a keypad component file, and the generating step for the GUI editor further comprises generating a definition drop down menu for each cell of the data sheet, comprising a plurality of menu items corresponding to the acquired key definitions used in the software application, facilitating the user in determining mapping between a position of the keypad matrix and one key definition by selecting one menu item.

* * * * *